US012675503B1

(12) United States Patent

James et al.

(10) Patent No.: US 12,675,503 B1

(45) Date of Patent: Jul. 7, 2026

(54) UNHANDLED DATA PROTECTION FOR PROGRAMMATIC INPUT/OUTPUT ROUTING TO DATASETS WITH USER-DEFINED PARTITIONS

(71) Applicant: Cisco Technology Inc., San Jose, CA (US)

(72) Inventors: Alexander D. James, Sammamish, WA (US); Vinayak Bhakta, San Jose, CA (US); Venkatasubramanian Jayaraman, Issaquah, WA (US); Ganesh Jothikumar, Los Altos, CA (US); Andrew John Peters, Sammamish, WA (US); Amy Sutedja, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/778,480

(22) Filed: Jul. 19, 2024

Related U.S. Application Data

(63) Continuation of application No. 18/162,639, filed on Jan. 31, 2023, now Pat. No. 12,072,913.

(51) Int. Cl.
G06F 16/28 (2019.01)
G06F 16/248 (2019.01)

(52) U.S. Cl.
CPC .......... G06F 16/285 (2019.01); G06F 16/248 (2019.01)

(58) Field of Classification Search
CPC ..................................................... G06F 16/285

(Continued)

(56) References Cited

U.S. PATENT DOCUMENTS

| 7,937,344 B2 | 5/2011 | Baum et al. |
| 8,112,425 B2 | 2/2012 | Baum et al. |

(Continued)

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

(Continued)

*Primary Examiner* — Syling Yen
(74) *Attorney, Agent, or Firm* — Shook, Hardy & Bacon L.L.P.

(57) ABSTRACT

Systems and methods are described for implementing programmatic input/output (I/O) routing to datasets with user-defined partitions while providing unhandled data protection. As disclosed herein, a user may define a dataset as including one or more partitions, each partition including criteria for storing data objects written to the partitioned dataset in the individual partitions. Data objects written to the dataset can then be evaluated according to the criteria, and routed to an appropriate partition. To provide unhandled data protection, a dataset definition can include a default partition to which data objects are routed when the data object fails to satisfy the criteria of any of the set of user-defined partitions identified in the specification. Processing I/O operations according to a user-defined partitioning schema can enable data objects to be arranged according to any partitioning schema without tethering the partitioning to a particular underlying storage system.

20 Claims, 9 Drawing Sheets

(58) Field of Classification Search
USPC ........................................................ 707/718
See application file for complete search history.

(56) References Cited

U.S. PATENT DOCUMENTS

| | | | | |
|---|---|---|---|---|
| 8,510,538 B1 * | 8/2013 | Malewicz | ............. | G06F 16/278 |
| | | | | 712/225 |
| 8,751,529 B2 | 6/2014 | Zhang et al. | | |
| 8,788,525 B2 | 7/2014 | Neels et al. | | |
| 9,215,240 B2 | 12/2015 | Merza et al. | | |
| 9,286,413 B1 | 3/2016 | Coates et al. | | |
| 10,127,258 B2 | 11/2018 | Lamas et al. | | |
| 10,936,585 B1 * | 3/2021 | Echeverria | ............. | G06F 16/258 |
| 11,609,933 B1 * | 3/2023 | Ozen | ................... | G06F 16/2477 |
| 12,072,913 B1 | 8/2024 | James et al. | | |
| 2016/0055192 A1 * | 2/2016 | Bensberg | ............ | G06F 16/2282 |
| | | | | 707/755 |
| 2019/0098106 A1 | 3/2019 | Mungel et al. | | |

OTHER PUBLICATIONS

Carraso, David, "Exploring Splunk," published by CITO Research, New York, NY, Apr. 2012.

SLAML 10 Reports, Workshop on Managing Systems via Log Analysis and Machine Learning Techniques. ; login: Feb. 2011—Conference Reports—vol. 36, No. 1, pp. 104-110.

SPLUNK Enterprise Overview 8.0.0—splunk > turn data into doing—copyright 2020 Splunk Inc.—in 17 pages—Retrieved from Splunk Documentation <URL: https://docs.splunk.com/Documentation> on May 20, 2020.

SPLUNK Cloud User Manual 8.0.2004—splunk> turn data in doing—copyright 2020 Splunk Inc.—in 66 pages—Retrieved from Splunk Documentation <URL: https://docs.splunk.com/Documentation> on May 20, 2020.

SPLUNK Quick Reference Guide, updated 2019, available online at https://www.splunk.com/pdfs/solution-guides/splunk-quick-reference-guide.pdf, retrieved May 20, 2020.

U.S. Appl. No. 18/429,254, filed Jan. 31, 2024, James et al.

U.S. Appl. No. 18/429,234, filed Jan. 31, 2024, James et al.

U.S. Appl. No. 18/429,276, filed Jan. 31, 2024, James et al.

* cited by examiner

100

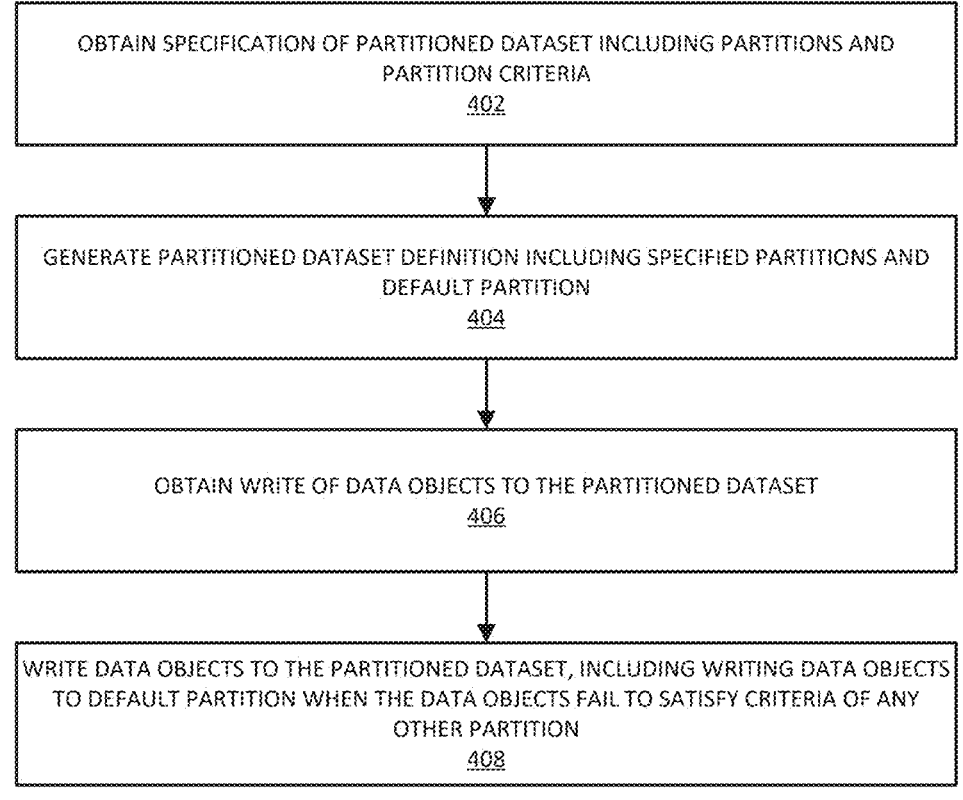

OBTAIN SPECIFICATION OF PARTITIONED DATASET INCLUDING PARTITIONS AND
PARTITION CRITERIA
402

GENERATE PARTITIONED DATASET DEFINITION INCLUDING SPECIFIED PARTITIONS AND
DEFAULT PARTITION
404

OBTAIN WRITE OF DATA OBJECTS TO THE PARTITIONED DATASET
406

WRITE DATA OBJECTS TO THE PARTITIONED DATASET, INCLUDING WRITING DATA OBJECTS
TO DEFAULT PARTITION WHEN THE DATA OBJECTS FAIL TO SATISFY CRITERIA OF ANY
OTHER PARTITION
408

UNHANDLED DATA PROTECTION FOR PROGRAMMATIC INPUT/OUTPUT ROUTING TO DATASETS WITH USER-DEFINED PARTITIONS

RELATED APPLICATIONS

Any and all applications for which a foreign or domestic priority claim is identified in the Application Data Sheet as filed with the present application are incorporated by reference under 37 CFR 1.57 and made a part of this specification. This application is a continuation of U.S. application Ser. No. 18/162,639, entitled UNHANDLED DATA PROTECTION FOR PROGRAMMATIC INPUT/OUTPUT ROUTING TO DATASETS WITH USER-DEFINED PARTITIONS, which was filed Jan. 31, 2023, and which is incorporated herein by reference in its entirety for all purposes and made part of this specification.

BRIEF DESCRIPTION OF THE DRAWINGS

FIG. 4 is a flowchart illustrating an example routine for programmatic input/output routing to datasets with user-defined partitions with unhandled data protection.

DETAILED DESCRIPTION

Figure 1:
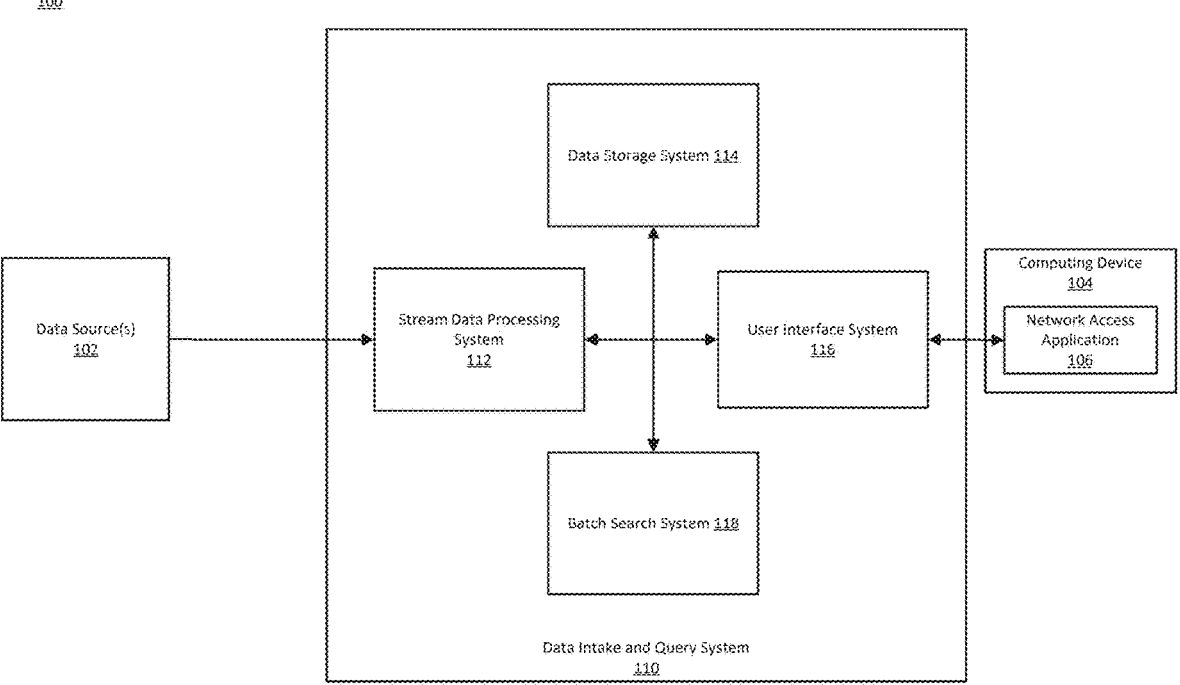
FIG. 1 depicts an example of a computing system in which aspects of the present disclosure can be implemented.

Generally described, aspects of the present disclosure relate to programmatic routing of input/output requests to datasets with user-defined partitions. Some embodiments further relate to unhandled data protection when implementing such programmatic routing. As used herein, a dataset refers to a collection of data objects, including both bounded collections stored at a given location (e.g., "data at rest") and potentially unbounded collections received over time (e.g., "streaming"). To facilitate handling of datasets, it may be desirable to partition the dataset into a set of partitions, each containing a subset of data objects from the dataset (and thus representing another dataset, which is a subset of the initial dataset). One mechanism for implementing such partitions is to require manual user assignment of data objects to partitions. For example, a user may define a data structure (such as a file system containing folders), and individually designate each data object as stored in a particular location of the data structure. Such individual designation is typically time consuming and subject to user-error. Another mechanism for implementing partitions is to programmatically assign partitions according to requirements of a storage system. For example, a time-series data store may assign data objects to "buckets" or other logical locations according to a time at which a data object is received, potentially "closing" buckets as they become full (according to a metric of the storage system) and creating new buckets to store subsequent data objects. Such system-driven partitioning is typically hidden from a user. For example, system partitions may not be directly addressable by user input/output commands. Moreover, such system-driven partitioning may not reflect organizational requirements of an end user, failing to enable the user to define partitions in which various data objects are stored and thus failing to enable logical arrangement of the data objects. This, in turn, inhibits rapid location of data objects, appropriate indexing of data objects, and programmatic manipulation of data objects by software applications, among other disadvantages.

The present disclosure provides an alternative to the above-noted techniques, whereby a storage system can facilitate programmatic routing of input/output requests to datasets with user-defined partitions, enabling an end user to define a partitioning schema for a dataset with criteria for storing data objects written to the dataset in individual partitions of the dataset. Embodiments of the present disclosure can then apply the user-defined partitioning schema to input/output operations on the dataset, facilitating storage and retrieval of data objects according to the user-defined partitioning schema. Moreover, embodiments of the present disclosure can provide for unhandled data protection when programmatically handling input/output operations on the dataset, such that data is not lost within the system without explicit user instruction.

In one embodiment, a user-defined partitioning schema is represented as a hierarchical tree data structure, such as a tree stored in JavaScript Object Notation. The dataset can be represented as a root node of the tree, including an identifier of the dataset, and subsequent child nodes can represent partitions of the dataset. In one embodiment, the tree is multi-leveled, such that partitions can themselves have sub-partitions represented as child nodes of the partition, which can in turn have further sub-partitions, etc. Each node may have criteria associated with the node, such that a data object written to a parent node (including the root note) is written to a child node if the data object satisfies criteria of the child node. When a leaf node (a node without child nodes) is reached, the data object is stored in association with the leaf node. Thus, data may be written to any node defined within the tree and handled appropriately, by programmatically routing the write to one or more leaf nodes according to the user-defined partitioning schema. Similarly, data may be read from any node within the tree by applying the read request to all leaf nodes under the specified node.

In one embodiment, the user-defined partitioning schema may identify a dataset type of each leaf nodes within a user-defined partitioning schema, such as by identifying each leaf node as either a dataset with user-defined partitioning (and thus corresponding to another user-defined partitioning schema) or a dataset on a substrate storage system. For example, an individual leaf node may be identified as corresponding to another dataset with user-defined partitioning schema, such that data written or read to the leaf node is handled as a read or write to the other dataset. Such dataset cross-referencing enables different datasets to be combined in a wide variety of manners, providing for flexible partitioning. As another example, an individual leaf node may be identified as corresponding to a dataset on a substrate storage system, such as a particular folder on a file system, a particular bucket on an object storage system, etc. Data written or read to the leaf node can then be handled by a storage system as a write or read to the dataset on a substrate storage system. Accordingly, user-defined partitioning schemas can enable logical grouping and organization of data objects into partitions while utilizing any wide variety of (or combination of) underlying storage systems.

A user-defined partitioning schema may include further information defining data handling for a dataset. For example, a tree or individual nodes of the tree may be associated with an attribute denoting how criteria of child nodes are to be evaluated. In one embodiment, the tree or an individual node is designated as having child nodes with either exclusive or non-exclusive criteria. In an illustrative case of exclusive criteria for a parent node (or an entire tree), child nodes are ordered, and each data object written to the parent node is compared to the criteria for the child nodes, in order, and written to the first child node for which the data object satisfies associated criteria. In an illustrative case of non-exclusive criteria, each data object written to the parent node is compared to the criteria for all child nodes, and written to any child nodes for which the data object satisfies associated criteria.

In one embodiment, one or more levels of a tree specified within a user-defined partitioning schema is associated with a default partition, to which data is to be written when the data object does not satisfy the criteria of any other child node at that level. Use of a default partition can thus ensure that data objects are not inadvertently dropped when written to a dataset (e.g., not propagated and written to a leaf node). Such a default partition can be especially beneficial when a parent node provides for non-exclusive criteria among child nodes, as it may be difficult to determine in the case of non-exclusive criteria whether all possible data objects have been handled by other child nodes. For example, an interface system may enable multiple end users to define partitions within a dataset and corresponding criteria. Each user may be unaware of the criteria set by other users, and whether or not data objects have been handled by such criteria. Accordingly, it may be unclear to each user whether the set of all criteria among child nodes captures all possible data objects. In such an instance, a default partition can enable unhandled data protection, such that data not handled by any user-defined child node (corresponding to user-defined partitions) is written to the default partition. In the case of exclusive criteria, the default partition can be associated with no criteria (e.g., represented by '*'), such that all data objects satisfy criteria of the default partition. In the case of non-exclusive criteria, the default partition can be associated with the negation of all criteria of other child nodes (e.g., "NOT ('A' OR 'B' OR 'C')", when 'A', 'B', and 'C' are criteria of user-defined partitions corresponding to child nodes at the same level as the default partition).

In one instance, datasets with user-defined partitions are implemented by a data storage system, such as a data intake and query system (DIQS) configured to ingest, index, store, and facilitate retrieval and searching of data. In another instance, datasets with user-defined partitions are implemented by a distinct system interacting with a backend or substrate data storage system, such as an input/output (I/O) parsing system or endpoint system, an ingestion system, or the like. For example, the distinct system may accept I/O operations from a user device or backend data storage system, process the I/O operations according to a dataset definition including user-defined partitions, and submit the I/O operations to the opposite party. As another example, the distinct system may accept data objects to be written to a dataset, process the data objects according to a definition of a partitioned dataset (e.g., including a user-defined partitioning schema), and write the data objects to locations of a backend storage system corresponding to leaf nodes in the definition. Accordingly, embodiments of the present disclosure may be implemented either directly by a data storage system or by an intermediary system.

Embodiments of the present disclosure can enable use of user-defined partitioning schema in the context of both data at rest and streaming data. For example, in the case of data at rest, a user-defined partitioning schema can be used to process I/O operations as noted above. Illustratively, in the case of queries to a read a data-at-rest dataset, a query to a given dataset implemented with a user-defined partitioning schema may be transformed into a query to each leaf node of the user-defined partitioning schema (e.g., transforming "read from 'dataset'" into "read from union('leaf node_a', 'leaf_node_b', 'leaf_node_c')" for a schema defining 'dataset' as having three leaf nodes). In the case of queries to write to a data-at-rest dataset, a query to a given dataset implemented with a user-defined partitioning schema may be transformed into a query to write to each leaf node of the user-defined partitioning schema according to the conditions of each leaf node (e.g., as a "branched" write, with each brand adopting criteria of the leaf node).

In the case of streaming data, a dataset with a user-defined partitioning schema may be used to enable programmatic ingestion of data according to the schema. Illustratively, a data stream may be written to a dataset with a user-defined partitioning schema, such that individual data objects in the stream are routed according to the user-defined partitioning schema and written to an appropriate leaf node. In some instances, streaming data may be handled by a streaming data processing system that facilitates manipulation of streaming data, such as via processing pipelines that specify a set of operations to be performed on streaming. Leaf nodes may thus correspond to processing pipelines, such that data objects written to a leaf node are passed to a data processing pipeline, processed according to the pipeline, and written to a destination dataset (which may itself be associated with a user-defined partitioning schema).

In some instances, a user-defined partitioning schema may be defined at least partly via creation of data processing pipelines. For example, a user may specify conditional routings within a data processing pipeline, such that data is routed from a first pipeline (or first portion of a pipeline) to a second pipeline (or second portion of a pipeline) when a data object satisfies specified criteria. In one embodiment, a streaming data processing system creates a partitioned dataset corresponding to this conditional routing, with the dataset corresponding to the source pipeline or pipeline portion and a partition within the dataset corresponding to the sink pipeline or pipeline portion, the partition having criteria matching the conditional routing. For example, a user may specify a pipeline as reading from "all data" (e.g., a stream representing all data entering the streaming data processing system) and, for data objects satisfying some criteria, conducting specified processing. In certain embodiments, such a specification may result in the streaming data processing system creating a dataset "all data" with user-defined partitioning schema defining a first user-defined partition corresponding to the pipeline (e.g., according to an internally created name for the pipeline), with the partition having criteria, in the schema, matching the user pipeline specification. In this manner, routing of data in or among data processing pipelines can be accomplished via datasets with user-defined partitioning schema, rather than requiring separate routing functionality.

As will be appreciated by one of skill in the art in light of the present disclosure, the embodiments disclosed herein improve the ability of computing systems, such data intake and query systems and/or streaming data processing systems, to provide for ingestion of data and processing of input/output operations against data. Moreover, the presently disclosed embodiments address technical problems inherent within computing systems; specifically, the difficulties of logically partitioning data according to user-defined schemas and to programmatically implementing such schemas with respect to input/output operations. These technical problems are addressed by the various technical solutions described herein, including creation of datasets partitioned according to a user-defined partitioning schema, with partitions in such a schema being user-defined and addressable, and programmatically routing input/output operations on datasets according to the schema, without requiring manual distribution of data objects among the partitions. Thus, the present disclosure represents an improvement in data intake and query systems and/or streaming data processing systems and computing systems in general.

The foregoing aspects and many of the attendant advantages of this disclosure will become more readily appreciated as the same become better understood by reference to the following description, when taken in conjunction with the accompanying drawings.

FIG. 1 illustrates an example of a computing system 100 in which aspects of the present disclosure can be implemented. In FIG. 1, system 100 illustratively implements a data intake and query system 110 configured to facilitate ingest, processing, and searching of data stored at the data intake and query system 110. The data intake and query system 110 of FIG. 1 may represent a simplified example of a general data intake and query system, such as the data intake and query systems described below with reference to FIGS. 5-9. Accordingly, it should be understood that embodiments described with reference to FIG. 1 may additionally or alternatively be implemented on the data intake and query systems described below. For example, the embodiments described with reference to FIG. 1 may additionally or alternatively be implemented on the data intake and query system of FIG. 5.

In FIG. 1, the data intake and query system 110 illustratively operates to collect, index, and enable searching of machine-generated data, such as for purposes of data analytics. The data intake and query system 110 further operates to enable data processing against streams of data, independent of or prior to collection, indexing and searching of that data. For example, the data intake and query system 110 can provide a stream data processing system 112 configured to conduct stream data processing on a data stream provided by a data source 102 and to output a resulting stream to a data storage system 114, where that stream can be stored as a data set queryable by a batch search system 118. The data intake and query system 118 can further provide a user interface system 116 enabling interaction with the stream data processing system 112, data storage system 114, and batch search system 118. For example, a client may utilize a computing device 104 with a network access application 106 (e.g., a web browser) to interface with the data intake and query system 110 through the user interface system 116 to configure data stream processing on the stream data processing system 112, to access data in the data storage system 114, to conduct batch searches using the batch search system 118, or the like.

Each data source 102 illustratively corresponds to a computing device that generates machine data, such as logs, metrics, or the like. For example, such machine data may be generated during operation of the data source 102 for other purposes (e.g., to implement other functionality of the computing system 100).

The stream data processing system 112 illustratively corresponds to one or more computing devices that obtain data from the data sources 102, manipulate the data according to one or more defined sets of data stream processing instructions, and output the data to a destination, such as the data storage system 114. Because data from data sources 102 in FIG. 1 is unbounded—that is, it has no pre-defined size or termination point—the data can be considered a data stream. Similarly, data output by the stream data processing system 112 can be considered a data stream. Accordingly, the manipulations of the stream data processing system are discussed here as stream data processing. In one embodiment, the stream data processing system 112 implements multiple sets of processing instructions, each associated with intaking a particular set of data (e.g., from one or more specified data sources 102), implementing one or more manipulations (e.g., including filtering, modifying, routing, or otherwise manipulating the data), and outputting the data (e.g., to one or more specified destinations). Each instruction set may be in some cases be referred to as a "pipeline." For example, each instruction set may be logically viewed as a pipeline through which data moves and is manipulated prior to being output.

One skilled in the art will recognize that data streams differ from defined or pre-existing data sets (referred to herein as "at-rest data sets" for brevity). For example, data streams unlike at-rest data sets typically have no fixed size or termination, but can continue (potentially indefinitely) as data is produced. Processing for at-rest data sets and data streams can differ. For example, while batch processing of an at-rest data set may apply statistical techniques (such as averages, medians, distributions, etc.) to the fixed set, stream data processing may apply such techniques to windows within the stream. Batch processing of at-rest data sets may be associated with more latency between data generation and processing than stream processing. For example, batch processing may occur periodically (e.g., every x minutes, hours, etc.), processing a past portion of data created by a data source, with each result being delayed by up to the periodicity. Stream processing may occur continuously, enabling rapid results to be produced. Batch processing of an at-rest data set can be preferably for some tasks, such as historical analysis of existing data, while stream data processing can be preferably for other tasks, such as continuous monitoring.

The stream data processing system 112 can output data streams to a variety of destinations. For example, where the batch search system 118 provides for indexing of data, the stream data processing system 112 may output a data stream to the batch search system 118 for indexing as a data set, as described in more detail below. As another example, the user interface system 116 may enable real-time review of data processing by the stream data processing system 112, and as such the stream data processing system 112 may output a data stream to the user interface system 116 for display on a computing device 104. As yet another example, the stream data processing system 112 may output a data stream to the data storage system 114 for storage.

The data storage system 114 illustratively corresponds to a network-accessible storage system, a variety of which may be used. Illustratively, the data storage system 114 stores data obtained from the stream data processing system 112. For example, the data storage system 114 may bucketize data obtained from the stream data processing system 112 to create data sets accessible by the batch search system 118, such as by storing each n period of a data stream as a distinct bucket of data. While FIG. 1 depicts the data storage system 114 in communication with the stream data processing system 112 (e.g., via a network on the data intake and query system 110), the data storage system 114 may additionally or alternatively obtain data from data sources 102 without use of the stream data processing system 112.

The batch search system 118 illustratively corresponds to one or more computing devices that conduct batch searches or other batch processing against at-rest data sets. For example, the batch search system 118 may include an indexing and search system as described below (e.g., the indexing system 520 and search system 560 of FIG. 5). The batch search system 118 may be configured to accept batch operations, such as queries, from a computing device 104 (e.g., via the user interface system 116) and apply such queries to a data set, which may for example be stored within the data storage system 114. Such queries may retrieve relevant data, manipulate the data according to one or more manipulations (e.g., filtering, routing, or transforming the data), and output results, such as by creating a new data set on the data storage system 114, presenting results to the computing device 104 via the user interface system 116, or the like.

As noted above, the user interface system 116 illustratively represents one or more computing devices providing interfaces for the data intake and query system 110. For example, the user interface system 116 may provide command line interfaces (CLIs), graphical user interfaces (GUIs), application programming interfaces (APIs), or the like that are accessible to computing devices 104 over a network to interact with the data intake and query system 110. In one embodiment, the user interface system 116 includes a web server configured to present web pages (e.g., as hypertext markup language, or "HTML", documents) to a computing device 104, which web pages provide an interface for interaction with the data intake and query system 110.

A computing device 104 can utilize a network accessible application 106 to access an interface provided by the user interface system 116 and thus interact with the data intake and query system 110. For example, the network access application 106 may represent a web browser that accesses web pages provided by the user interface system 116, which web pages enable a user of the computing device 104 to, e.g., browse and retrieve data in the data storage system 114, submit queries to the batch search system 118 and obtain results of such queries, or author data stream processing instruction sets ("pipelines") for deployment on the stream data processing system 112.

In accordance with embodiments of the present disclosure, various elements of the data intake and query system 110, such as the stream data processing system 112 and batch search system 118, are configured to implement programmatic handling of I/O operations to logical datasets with user-defined partitioning schemas. As discussed above, such a dataset can represent a logical object data intake and query system 110, to which I/O operations may be directed.

A schema of the dataset can specify a number of user-defined partitions and, for individual partitions, criteria for storing data objects written to the dataset in the individual partitions. The schema is illustratively organized as a tree, with leaf nodes corresponding to a destination capable of accepting I/O operations (such as another dataset with user-defined partitioning schema, a processing pipeline, a storage location on a substrate storage system, or the like). Accordingly, elements of the data intake and query system 110 may accept I/O operations to a dataset with user-defined partitioning schemas, process the I/O operations according to the schema to result in one or more additional I/O operations to destinations corresponding to leaf nodes, and submit the one or more additional I/O operations to the destinations for further processing. In this manner, I/O operations may be programmatically routed according to the user-defined partitioning schema, enabling data to be partitioned in any logical manner that is decoupled from physical storage of the data on a substrate storage system.

In accordance with embodiments of the present disclosure, the data intake and query system 110 may provide for creation of default partitions within a user-defined partitioning schema. For example, where a user specifies a set of user-defined partitions for a dataset, the data intake and query system 110 may further include within the schema a default partition representing a destination to which data objects are routed when the individual data objects fail to satisfy the criteria of any of the set of user-defined partitions identified in the specification. Such a default partition can provide for unhandled data protection, avoiding loss of data that is not otherwise routed according to a user-defined partition. Such unhandled data protection may be especially desirable in the instance where criteria for the user-defined partitions is non-exclusive, as it may be difficult in such instances to reason as to whether all data objects have been handled by the user-defined partitions.

Figure 2:
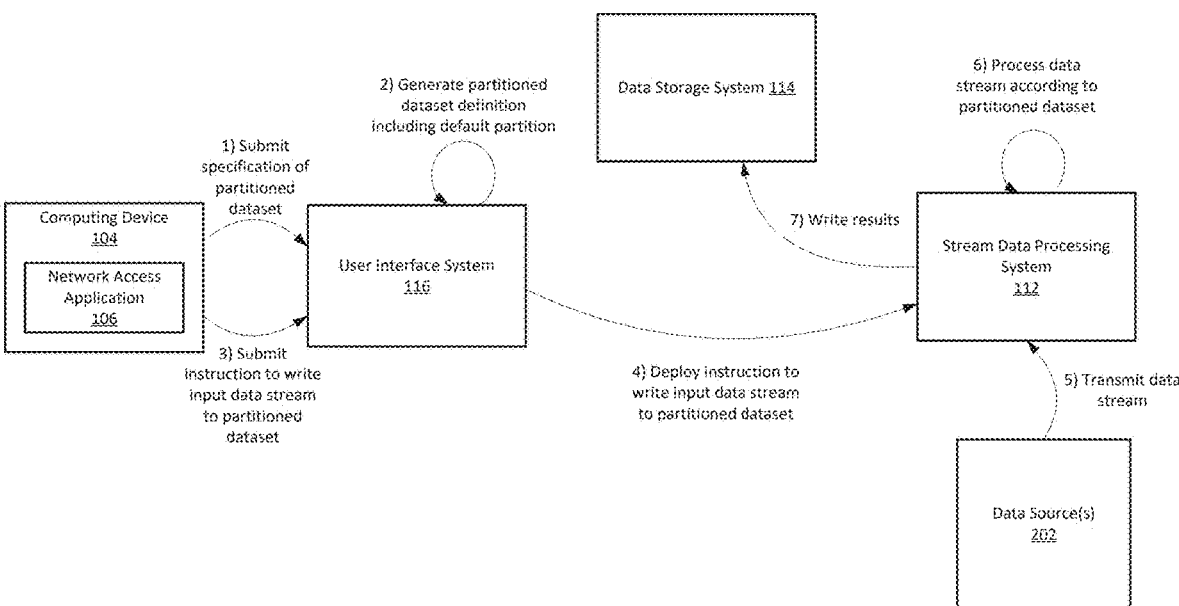
FIG. 2 depicts illustrative interactions for creation of a dataset with user-defined partitions, including a default partition, on data of the intake and query system of FIG. 1, and for programmatically handling ingestion of a data stream using a definition of the dataset.
Figure 3:
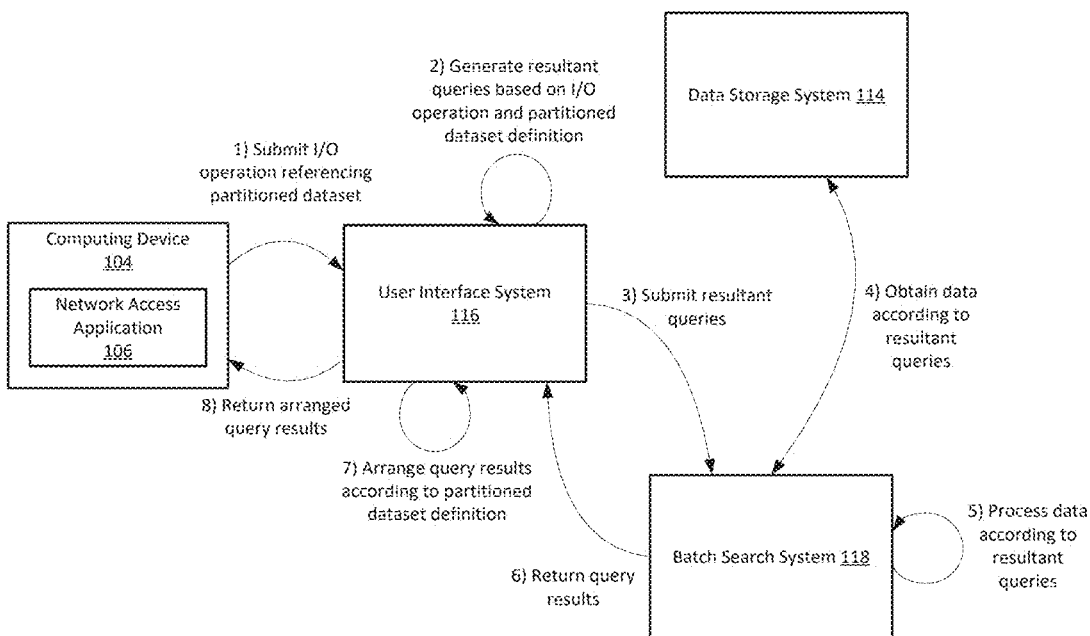
FIG. 3 depicts example interactions for handling I/O operations to a dataset with user-defined partitions on data of the intake and query system of FIG. 1.

With reference to FIGS. 2 and 3, illustrative interactions will be described for creation and use of a dataset with user-defined partitions on a data intake and query system 110 in accordance with embodiments of the present disclosure. Specifically, FIG. 2 depicts illustrative interactions for creation of a dataset with user-defined partitions, including a default partition, on data of the intake and query system 110, and for programmatically handling ingestion of a data stream using a definition of the dataset. FIG. 3 depicts example interactions for handling I/O operations to the dataset with user-defined partitions.

The interactions of FIG. 2 begin at (1), where a user, using a computing device 104, submits to the user interface system 116 a specification of a dataset with user-defined partitions. Illustratively, the specification may name the dataset and identify a set of partitions of the dataset as well as criteria corresponding to each partition. The criteria illustratively correspond to attributes of data objects to be written to a given partition, such by specifying values of fields of such data objects. The specification illustratively defines a tree with the dataset as a root node, the partitions as child nodes of the root node, and leaf nodes as destinations to which data objects can be written. As discussed above, such destinations can include other datasets with user-defined partitions, locations on a substrate storage system, or data processing pipelines on a streaming data processing system, among others.

In one instance, the specification is itself a data object, such as a JavaScript Object Notation (JSON) file. For example, a specification may be represented as:

```
{
    name: "mydataset",
    kind: "partitioned"
    partitioning: {
        kind: "overlapping",
        partitions: [
            {condition: "sourcetype=foo", dataset: "Dataset1"
            },
            {condition: "sourcetype=bar", dataset: "Dataset2"
            }
        ]
    ]
}
``` where "mydataset" is the name of the dataset (representing a root node) and "Dataset1" and "Dataset2" are user-defined partitions within the dataset each associated with respective criteria for objects to be written to the user-defined partitions ("sourcetype=foo" for Dataset1 and "sourcetype=bar" for Dataset2, representing required values for a "sourcetype" field of data objects). While an illustrative example is shown above, the specification may be represented in any variety of formats, including serialized formats, deserialized formats, or various encodings of these formats. As discussed above, a dataset specification may include additional information, such as a partitioning type (or "kind") indicating whether criteria for partitions is exclusive or non-exclusive. In the example above, a "kind" value of "overlapping" illustratively indicates non-exclusive criteria. An alternative value, such as "exclusive" may indicate exclusive criteria. In the example above, "Dataset1" and "Dataset2" may represent any variety of destinations capable of accepting I/O operations, including other datasets with user-defined partitions, locations on a substrate storage system (e.g., the data storage system 114), processing pipelines on the stream data processing system 112, or the like. As discussed in detail below, the data intake and query system 110 can store a definition of the dataset as a data object (e.g., on the data storage system 114) and thereafter use the definition to handle I/O operations to the dataset. In this manner, the dataset represents a logical construct on the data intake and query system 110, rather than a fixed set of data. Accordingly, such datasets enable a user to arrange data and programmatically handle I/O operations in a wide variety of manners, without directly tying storage of data objects to a particular substrate storage mechanism.

While a user may directly provide a specification in some instances, in other instances a user may specify a dataset with user-defined partitioning via other inputs. For example, in the context of a stream data processing system 112, a user may specify user-defined partitions by generation or manipulation of processing pipelines. Illustratively, the stream data processing system 112 may generate a dataset representing a data stream flowing into the stream data processing system 112, and a user my specify a pipeline that processes some data objects of the stream, matching specified criteria. Input specifying the pipeline may be used as input designating a user-defined partition for the dataset, with criteria for the partition matching the criteria specified for the pipeline. For example, rather than deploying a pipeline having a conditional branch, the stream data processing system 112 may transform the conditional branch into creation of a user-defined partition (e.g., with a system-generated identifier) and then deploy a modified version of the pipeline such that the pipeline reads from the user-defined partition. In this manner, the stream data processing system 112 can avoid a need to implement conditional routing within pipelines. Rather, each conditional routing can be replicated by use of datasets with user-defined partitions, such that rather than data flowing to a conditional routing branch in a pipeline, it is written to a dataset, and such that rather than data flowing into a portion of a pipeline according to conditional routing, the pipeline obtains data from a partition of the dataset. The conditional routing can then be achieved as criteria for partitions of the dataset, according to the embodiments disclosed herein.

As noted above, it may be beneficial in some instances to provide for protection against unhandled data when providing for datasets with user-defined partitioning. Accordingly, at (2), the user interface system 116 generates a definition for the dataset according to the user specification, while including within the definition a default partition to which data objects are written when such data objects fail to satisfy criteria of any other partition. For example, the definition may be represented as

```
{
    name: "mydataset",
    kind: "partitioned"
    partitioning: {
        kind: "overlapping",
        partitions: [
            {condition: "sourcetype=foo", dataset: "Dataset1"
            },
            {condition: "sourcetype=bar", dataset: "Dataset2"
            }
            {default: true, dataset: "failsafe" }
        ]
    ]
}
```

That is, the definition may be similar to the user specification, but with the addition of a default partition. As noted above with respect to the specification, the definition may be presented in any number of formats, including serialized formats, deserialized formats, or different encodings. The definition may also be referred to herein as a partitioning schema. Accordingly, data objects written to the dataset that fail to satisfy conditions of any partition may be written to the default partition, providing for protection against unhandled data.

Thereafter, at (3), the user via the computing device 104 submits to the user interface system 116 instructions to write an input data stream to the partitioned dataset. For example, the user may deploy a processing pipeline that reads from the data stream and writes to the partitioned dataset. The user interface system 116 in turn, at (4), deploys to the stream data processing system instructions to write the input data stream to the partitioned dataset.

In FIG. 2, the input data stream is illustrative provided by a data source 202, which transmits the data stream to the stream data processing system 112 at (5). Transmission may include, for example, the data source 202 "pushing" data objects of the stream to the stream data processing system 112 or the stream data processing system 112 "pulling" data objects from the data source 202 (e.g., by periodically or continuously querying the data source 202 for data objects). In accordance with operation of data streams, the transmission of (5) can occur continuously or periodically, rather than as a single operation.

Thereafter, at (6), the stream data processing system 112 processes data objects of the data stream according to the dataset definition, including the user-defined partitioning schema. Specifically, the stream data processing system 112 may interpret each data object as a "write" input operation to the dataset, determine whether the data object meets criteria of any user-defined partitions in the dataset definition, and if so, write the data object to such user-defined partitions. Where the dataset definition specifies exclusive criteria among the user-defined partitions, each data object may be written to at most a single user-defined partition. Where the dataset definition specifies non-exclusive criteria among the user-defined partitions, each data object may be written to multiple user-defined partitions. In the case that a data object fails to satisfy criteria for any user-defined partition within the dataset definition, the stream data processing system 112 can write the data object to a default partition.

In the illustrative example of FIG. 2, each destination within the dataset definition (e.g., each user-defined partition and the default partition) corresponds to a location on the data storage system 114. Accordingly, at (7), the stream data processing system 112 writes results to the data storage system 114 in appropriate locations, corresponding to the appropriate destination for the data object per the dataset definition. However, the stream data processing system 112 may support other destinations, including pipelines on the stream data processing system 112, other datasets defined on the stream data processing system 112, locations on external computing systems, or the like. For example, where a destination is a pipeline on the stream data processing system 112, the stream data processing system 112 may process each data object written to the destination according to the pipeline. Where a destination is another dataset defined on the stream data processing system 112, the stream data processing system 112 may process each data object written to the destination as a write input operation to the dataset (e.g., by repeating interaction (6) according to the definition of that dataset). Where the destination is an external computing system, the stream data processing system 112 may transmit each data object written to the destination to the external computing system. Accordingly, the dataset definition facilitates any variety of programmatic routing of input operations to a dataset.

With reference to FIG. 3, illustrative interactions will be describe for handling I/O operations to a dataset with user-defined partitions via user queries. Illustratively, the data intake and query system 110 may enable a user, using a computing device 104 to submit queries to a dataset with user-defined partitions and obtain results of such queries. As used herein, the term "query" is a broad term that includes both requests to retrieve information from a dataset and to manipulate the dataset, such as by creating data objects, destroying data objects, or modifying data objects. Illustratively, queries may be authored in a structured query language.

The interactions of FIG. 3 begin at (1), where a user, via a computing device 104, submits an I/O operation to the user interface system 116. For example, the user may submit a user authored query, such as a request to read from or write to a dataset with user-defined partitions.

At (2), the user interface system 116 generates one or more resultant queries from the user-authored query according to the I/O operation and a definition for the dataset to which the I/O operation is directed. For example, in the case of a request to read data from the dataset, the user-authored query be transformed into a query to read from a union of all partitions of the dataset (e.g., user-defined partitions, a default partition, etc.). In the case of a request to write to the dataset, the user-authored query be transformed into a conditionally branched query to write to partitions of the dataset according to the criteria for each partition in the dataset definition. Accordingly, I/O operations addressed to the dataset can be transformed into one or more I/O operations addressed to partitions of the dataset. In the context of FIG. 3, it is assumed that partitions correspond to logical storage locations associated with the data storage system 114. Accordingly, the queries are transmitted to the batch search system 118 for handling, at (3). However, partitions may alternatively correspond to other datasets with user-defined partitions (in which case queries to such partitions may be handled by repeating interaction (2) with respect to such queries), datasets on external computing systems (in which case queries may be handled by transmitting the queries to such external computing systems for handling), data streams (in which case queries may be transmitted to the stream data processing system 112 for handling), etc.

As shown in FIG. 3, the batch search system 118 then processes the resultant queries according to operation of that system 118. Specifically, the batch search system 118 obtains data from the data storage system 114 according to the resultant queries at (4), processes the data according to the resultant queries at (5), and returns query results to the user interface system 116 at (6). A variety of mechanisms to process queries at a batch search system 118 are known in the art and thus will not be described in detail herein. Where additional or alternative destinations for queries are determined at (2), these additional or alternative destinations may similar process their respective queries and return query results to the user interface system 116.

At (7), the user interface system 116 arranges query results according to the partitioned dataset definition. Illustratively, the query results returned from the batch search system 118 (or additional or alternative destinations) may be arranged according to the partitions of a user-defined partitioning schema, as these destinations may be unaware of the user-defined partitioning schema. Accordingly, the user interface system 116 may group, collate, or otherwise arrange the results in a manner defined by the partitioning schema for the dataset, such as by arranging results of the query into a tree hierarchy as defined by the partitioning schema. An end user may thus be provided with results as if the portioning schema were directly implemented in a substrate storage system (e.g., the data storage system 114). In this manner, a dataset with user-defined partitioning, as implemented via the user interface system 116 may be virtually or actually indistinguishable from other datasets. That is, I/O operations may be directed to the dataset in a manner similar to or the same as other datasets, with such operations programmatically routed to partitions according to the portioning schema for the dataset.

FIG. 4 is a flowchart illustrating an example routine 400 for programmatic input/output routing to datasets with user-defined partitions with unhandled data protection. The routine 400 can be implemented, for example, by a computing device that comprises a processor and a non-transitory computer-readable medium. The non-transitory computer readable medium can be storing instructions that, when executed by the processor, can cause the processor to perform the operations of the illustrated routine 400. Alternatively or additionally, the routine 400 can be implemented using a non-transitory computer-readable medium storing instructions that, when executed by one or more processors, case the one or more processors to perform the operations of the routine 400 of FIG. 4. In one example, the routine 400 is implemented by the data intake and query system 110 (e.g., by the user interface system 116 or another element of the data intake and query system 110, independently or in conjunction with other elements of the system 110). The routine 400 can be additionally or alternatively be implemented by other elements of a distributed computing system. Further, the routine 400 may be implemented separately by multiple elements of a distributed computing system.

The routine 400 begins at block 402, where the data intake and query system 110 obtains specification from a user of a dataset including one or more user-defined partitions and criteria for such partitions. As discussed above, the specification may be explicit, such as submission of a JSON-formatted input, or implicit, such as by specification of processing pipelines on a stream data processing system. The specification illustratively identifies the dataset and each partition. For individual partitions, the specification can include criteria denoted which data objects written to the data set are to be written to each partition of the dataset. The specification can further indicate how criteria are to be applied, by considering criteria to be exclusive or non-exclusive among partitions. Each partition illustratively corresponds to a destination to which data objects may be written and from which data objects may be read, including another dataset with user-defined partitions, a location on a substrate storage system, a location on an external computing system, a data processing pipeline on a stream data processing system, or the like.

At block 404, the data intake and query system 110 generates a definition for the partitioned dataset according to the specification. More specifically, to provide for protection against unhandled data, the data intake and query system 110 generates a definition that includes a default partition to which write operations for data objects are routed when such data objects fail to satisfy the criteria of any of the set of user-defined partitions identified in the specification. Accordingly, should the user fail within the specification to define a destination for certain types of data objects, such data objects can be handled by writing to the default partition. Notably, this mechanism nevertheless allows explicit discarding of data objects, such as by specification that such data objects should be routed to a "null" location or other destination for discarding data objects. However, this mechanism beneficially prevents such discarding without explicit indication in the specification that data objects should be discarded, and thus prevents inadvertent loss of data when implementing datasets with user-defined partitioning schemas. As noted above, in the case of exclusive criteria, the default partition can be associated with no criteria (e.g., represented by '*'), such that all data objects satisfy criteria of the default partition. In the case of non-exclusive criteria, the default partition can be associated with the negation of all criteria of other child nodes (e.g., "NOT ('A' OR 'B' OR 'C')", when 'A', 'B', and 'C' are criteria of user-defined partitions corresponding to child nodes at the same level as the default partition).

At block 406, the data intake and query system 110 obtains a write of one or more data objects to the partitioned dataset. A write may generally refer to any I/O operation corresponding to an instruction to store the data objects within the dataset. For example, the data intake and query system 110 may obtain data objects as part of a data stream at the stream data processing system 112, obtain data objects as part of a query to the user interface system 116, etc.

At block 408, the data intake and query system 110 then writes the data objects to the partitioned dataset, including writing data objects to default partition when the data objects fail to satisfy criteria of any other partition. More specifically, the data intake and query system 110 can compare attributes of each data object (e.g., field values) to criteria for each partition within the user-defined partitioning schema for the dataset, and write the data objects to the partition or partitions within the schema for which the object satisfies the criteria. As discussed above, such writing can include writing the data objects to another dataset with a user-defined partitioning schema, to a processing pipeline, to an external storage system, to a storage location on a substrate storage system, or the like. Accordingly, the data intake and query system 110 can implement programmatic writing of data objects to the dataset according to the user-defined partitioning schema, such that the data objects are stored in appropriate user-accessible partitions without requiring manual placement of data objects in such partitions and without reliance on a particular substrate storage system. Moreover, as noted above, because the user-defined partitioning schema includes a default partition, data objects that are otherwise unhandled within the defined partitioning schema are nevertheless handled by the default partition, avoiding inadvertent loss of data objects when implementing datasets with user-defined partitions. The routine then ends.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 5:
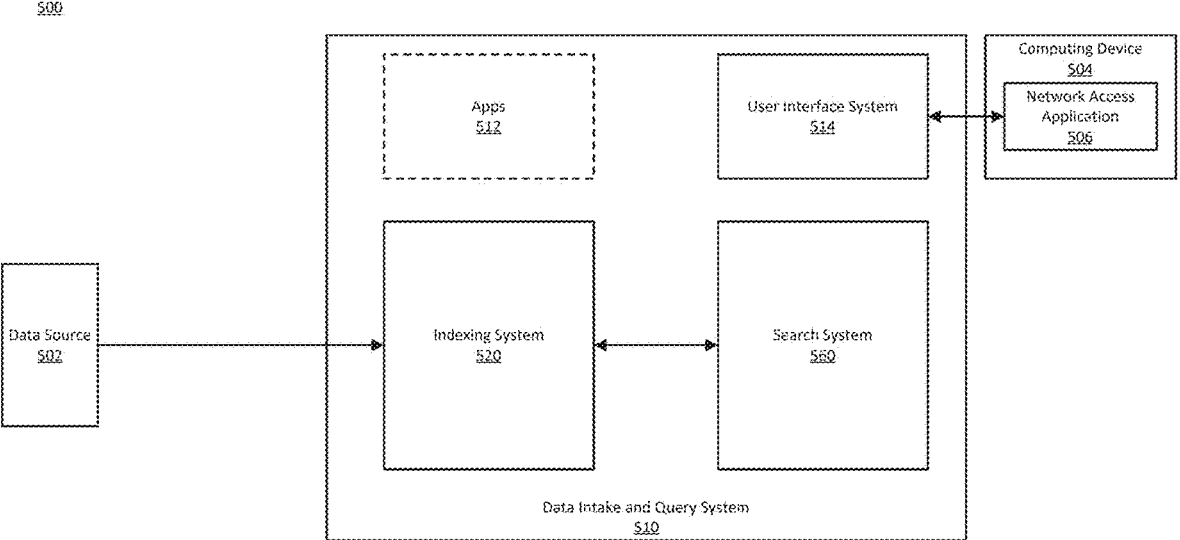
FIG. 5 is a block diagram illustrating an example computing environment that includes a data intake and query system.

FIG. 5 is a block diagram illustrating an example computing environment 500 that includes a data intake and query system 510. The data intake and query system 510 obtains data from a data source 502 in the computing environment 500, and ingests the data using an indexing system 520. A search system 560 of the data intake and query system 510 enables users to navigate the indexed data. Though drawn with separate boxes in FIG. 5, in some implementations the indexing system 520 and the search system 560 can have overlapping components. A computing device 504, running a network access application 506, can communicate with the data intake and query system 510 through a user interface system 514 of the data intake and query system 510. Using the computing device 504, a user can perform various operations with respect to the data intake and query system 510, such as administration of the data intake and query system 510, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 510 can further optionally include apps 512 that extend the search, analytics, and/or visualization capabilities of the data intake and query system 510.

The data intake and query system 510 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 510 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 510 can be executed on a single computing device, or execution of the program code can be distributed over multiple computing devices. For example, the program code can include instructions for both indexing and search components (which may be part of the indexing system 520 and/or the search system 560, respectively), which can be executed on a computing device that also provides the data source 502. As another example, the program code can be executed on one computing device, where execution of the program code provides both indexing and search components, while another copy of the program code executes on a second computing device that provides the data source 502. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 502 of the computing environment 500 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 502 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 520 obtains machine date from the data source 502 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 520 does not require prior knowledge of the structure of incoming data (e.g., the indexing system 520 does not need to be provided with a schema describing the data). Additionally, the indexing system 520 retains a copy of the data as it was received by the indexing system 520 such that the original data is always available for searching (e.g., no data is discarded, though, in some examples, the indexing system 520 can be configured to do so).

The search system 560 searches the data stored by the indexing 520 system. As discussed in greater detail below, the search system 560 enables users associated with the computing environment 500 (and possibly also other users) to navigate the data, generate reports, and visualize search results in "dashboards" output using a graphical interface. Using the facilities of the search system 560, users can obtain insights about the data, such as retrieving events from an index, calculating metrics, searching for specific conditions within a rolling time window, identifying patterns in the data, and predicting future trends, among other examples. To achieve greater efficiency, the search system 560 can apply map-reduce methods to parallelize searching of large volumes of data. Additionally, because the original data is available, the search system 560 can apply a schema to the data at search time. This allows different structures to be applied to the same data, or for the structure to be modified if or when the content of the data changes. Application of a schema at search time may be referred to herein as a late-binding schema technique.

The user interface system 514 provides mechanisms through which users associated with the computing environment 500 (and possibly others) can interact with the data intake and query system 510. These interactions can include configuration, administration, and management of the indexing system 520, initiation and/or scheduling of queries that are to be processed by the search system 560, receipt or reporting of search results, and/or visualization of search results. The user interface system 514 can include, for example, facilities to provide a command line interface or a web-based interface.

Users can access the user interface system 514 using a computing device 504 that communicates with data intake and query system 510, possibly over a network. A "user," in the context of the implementations and examples described herein, is a digital entity that is described by a set of information in a computing environment. The set of information can include, for example, a user identifier, a user-name, a password, a user account, a set of authentication credentials, a token, other data, and/or a combination of the preceding. Using the digital entity that is represented by a user, a person can interact with the computing environment 500. For example, a person can log in as a particular user and, using the user's digital information, can access the data intake and query system 510. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 504 can provide a human-machine interface through which a person can have a digital presence in the computing environment 500 in the form of a user. The computing device 504 is an electronic device having one or more processors and a memory capable of storing instructions for execution by the one or more processors. The computing device 504 can further include input/output (I/O) hardware and a network interface. Applications executed by the computing device 504 can include a network access application 506, such as a web browser, which can use a network interface of the client computing device 504 to communicate, over a network, with the user interface system 514 of the data intake and query system #A110. The user interface system 514 can use the network access application 506 to generate user interfaces that enable a user to interact with the data intake and query system #A110. A web browser is one example of a network access application. A shell tool can also be used as a network access application. In some examples, the data intake and query system 510 is an application executing on the computing device 506. In such examples, the network access application 506 can access the user interface system 514 without going over a network.

The data intake and query system 510 can optionally include apps 512. An app of the data intake and query system 510 is a collection of configurations, knowledge objects (a user-defined entity that enriches the data in the data intake and query system 510), views, and dashboards that may provide additional functionality, different techniques for searching the data, and/or additional insights into the data. The data intake and query system 510 can execute multiple applications simultaneously. Example applications include an information technology service intelligence application, which can monitor and analyze the performance and behavior of the computing environment 500, and an enterprise security application, which can include content and searches to assist security analysts in diagnosing and acting on anomalous or malicious behavior in the computing environment 500.

Though FIG. 5 illustrates only one data source, in practical implementations, the computing environment 500 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 500, the data intake and query system 510 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 500 can include on-prem and cloud-based computing resources, or only cloud-based resources. For example, an entity may have on-prem computing devices and a private cloud. In this example, the entity operates the data intake and query system 510 and can choose to execute the data intake and query system 510 on an on-prem computing device or in the cloud. In another example, a provider entity operates the data intake and query system 510 in a public cloud and provides the functionality of the data intake and query system 510 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 510. In some implementations, the entity providing the data intake and query system 510 is itself subscribing to the cloud services of a cloud service provider. As an example, a first entity provides computing resources under a public cloud service model, a second entity subscribes to the cloud services of the first provider entity and uses the cloud computing resources to operate the data intake and query system 510, and a third entity can subscribe to the services of the second provider entity in order to use the functionality of the data intake and query system 510. In this example, the data sources are associated with the third entity, users accessing the data intake and query system 510 are associated with the third entity, and the analytics and insights provided by the data intake and query system 510 are for purposes of the third entity's operations.

Figure 6:
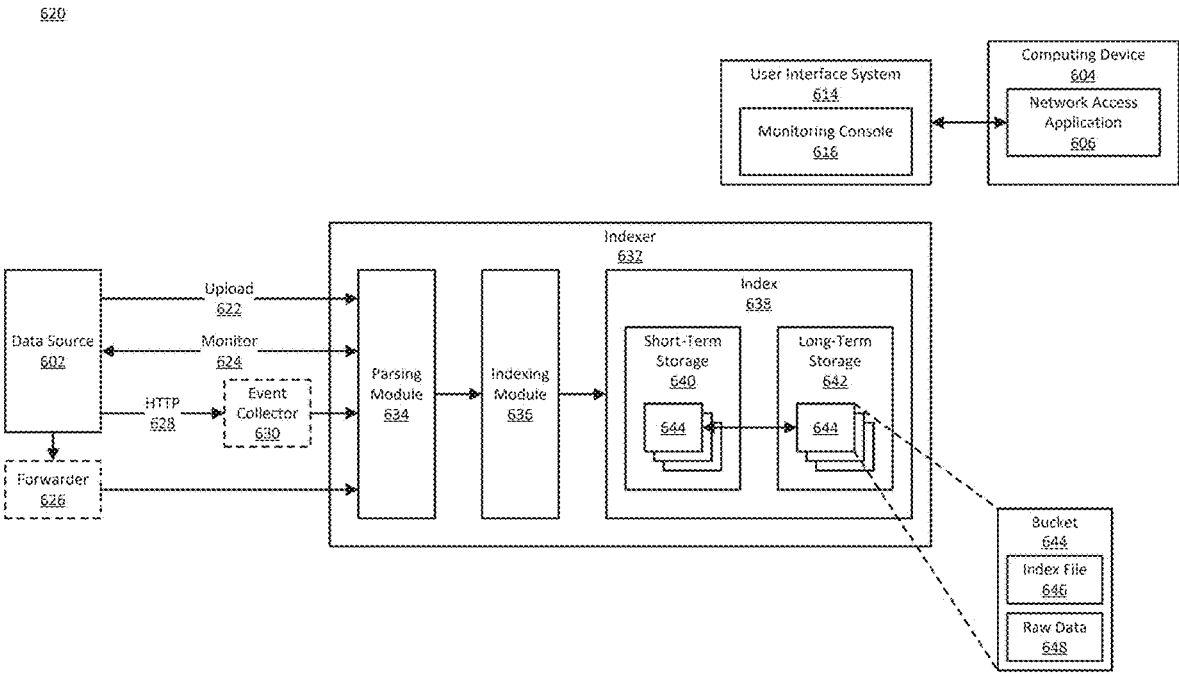
FIG. 6 is a block diagram illustrating in greater detail an example of an indexing system of a data intake and query system.

FIG. 6 is a block diagram illustrating in greater detail an example of an indexing system 620 of a data intake and query system, such as the data intake and query system 510 of FIG. 5. The indexing system 620 of FIG. 6 uses various methods to obtain machine data from a data source 602 and stores the data in an index 638 of an indexer 632. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 620 enables the data intake and query system to obtain the machine data produced by the data source 602 and to store the data for searching and retrieval.

Users can administer the operations of the indexing system 620 using a computing device 604 that can access the indexing system 620 through a user interface system 614 of the data intake and query system. For example, the computing device 604 can be executing a network access application 606, such as a web browser or a terminal, through which a user can access a monitoring console 616 provided by the user interface system 614. The monitoring console 616 can enable operations such as: identifying the data source 602 for data ingestion; configuring the indexer 632 to index the data from the data source 632; configuring a data ingestion method; configuring, deploying, and managing clusters of indexers; and viewing the topology and performance of a deployment of the data intake and query system, among other operations. The operations performed by the indexing system 620 may be referred to as "index time" operations, which are distinct from "search time" operations that are discussed further below.

The indexer 632, which may be referred to herein as a data indexing component, coordinates and performs most of the index time operations. The indexer 632 can be implemented using program code that can be executed on a computing device. The program code for the indexer 632 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 632. In some implementations, the indexer 632 executes on the computing device 604 through which a user can access the indexing system 620. In some implementations, the indexer 632 executes on a different computing device than the illustrated computing device 604.

The indexer 632 may be executing on the computing device that also provides the data source 602 or may be executing on a different computing device. In implementations wherein the indexer 632 is on the same computing device as the data source 602, the data produced by the data source 602 may be referred to as "local data." In other implementations the data source 602 is a component of a first computing device and the indexer 632 executes on a second computing device that is different from the first computing device. In these implementations, the data produced by the data source 602 may be referred to as "remote data." In some implementations, the first computing device is "on-prem" and in some implementations the first computing device is "in the cloud." In some implementations, the indexer 632 executes on a computing device in the cloud and the operations of the indexer 632 are provided as a service to entities that subscribe to the services provided by the data intake and query system.

For a given data produced by the data source 602, the indexing system 620 can be configured to use one of several methods to ingest the data into the indexer 632. These methods include upload 622, monitor 624, using a forwarder 626, or using HyperText Transfer Protocol (HTTP 628) and an event collector 630. These and other methods for data ingestion may be referred to as "getting data in" (GDI) methods.

Using the upload 622 method, a user can specify a file for uploading into the indexer 632. For example, the monitoring console 616 can include commands or an interface through which the user can specify where the file is located (e.g., on which computing device and/or in which directory of a file system) and the name of the file. The file may be located at the data source 602 or may be on the computing device where the indexer 632 is executing. Once uploading is initiated, the indexer 632 processes the file, as discussed further below. Uploading is a manual process and occurs when instigated by a user. For automated data ingestion, the other ingestion methods are used.

The monitor 624 method enables the indexing system 602 to monitor the data source 602 and continuously or periodically obtain data produced by the data source 602 for ingestion by the indexer 632. For example, using the monitoring console 616, a user can specify a file or directory for monitoring. In this example, the indexing system 602 can execute a monitoring process that detects whenever the file or directory is modified and causes the file or directory contents to be sent to the indexer 632. As another example, a user can specify a network port for monitoring. In this example, a monitoring process can capture data received at or transmitting from the network port and cause the data to be sent to the indexer 632. In various examples, monitoring can also be configured for data sources such as operating system event logs, performance data generated by an operating system, operating system registries, operating system directory services, and other data sources.

Monitoring is available when the data source 602 is local to the indexer 632 (e.g., the data source 602 is on the computing device where the indexer 632 is executing). Other data ingestion methods, including forwarding and the event collector 630, can be used for either local or remote data sources.

A forwarder 626, which may be referred to herein as a data forwarding component, is a software process that sends data from the data source 602 to the indexer 632. The forwarder 626 can be implemented using program code that can be executed on the computer device that provides the data source 602. A user launches the program code for the forwarder 626 on the computing device that provides the data source 602. The user can further configure the forwarder 626, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 626 can provide various capabilities. For example, the forwarder 626 can send the data unprocessed or can perform minimal processing on the data before sending the data to the indexer 632. Minimal processing can include, for example, adding metadata tags to the data to identify a source, source type, and/or host, among other information, dividing the data into blocks, and/or applying a timestamp to the data. In some implementations, the forwarder 626 can break the data into individual events (event generation is discussed further below) and send the events to a receiver. Other operations that the forwarder 626 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 630 provides an alternate method for obtaining data from the data source 602. The event collector 630 enables data and application events to be sent to the indexer 632 using HTTP 628. The event collector 630 can be implemented using program code that can be executing on a computing device. The program code may be a component of the data intake and query system or can be a standalone component that can be executed independently of the data intake and query system and operates in cooperation with the data intake and query system.

To use the event collector 630, a user can, for example using the monitoring console 616 or a similar interface provided by the user interface system 614, enable the event collector 630 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 602 as an alternative method to using a username and password for authentication.

To send data to the event collector 630, the data source 602 is supplied with a token and can then send HTTP 628 requests to the event collector 630. To send HTTP 628 requests, the data source 602 can be configured to use an HTTP client and/or to use logging libraries such as those supplied by Java, JavaScript, and NET libraries. An HTTP client enables the data source 602 to send data to the event collector 630 by supplying the data, and a Uniform Resource Identifier (URI) for the event collector 630 to the HTTP client. The HTTP client then handles establishing a connection with the event collector 630, transmitting a request containing the data, closing the connection, and receiving an acknowledgment if the event collector 630 sends one. Logging libraries enable HTTP 628 requests to the event collector 630 to be generated directly by the data source. For example, an application can include or link a logging library, and through functionality provided by the logging library manage establishing a connection with the event collector 630, transmitting a request, and receiving an acknowledgement.

An HTTP 628 request to the event collector 630 can contain a token, a channel identifier, event metadata, and/or event data. The token authenticates the request with the event collector 630. The channel identifier, if available in the indexing system 620, enables the event collector 630 to segregate and keep separate data from different data sources. The event metadata can include one or more key-value pairs that describe the data source 602 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 630 extracts events from HTTP 628 requests and sends the events to the indexer 632. The event collector 630 can further be configured to send events to one or more indexers. Extracting the events can include associating any metadata in a request with the event or events included in the request. In these implementations, event generation by the indexer 632 (discussed further below) is bypassed, and the indexer 632 moves the events directly to indexing. In some implementations, the event collector 630 extracts event data from a request and outputs the event data to the indexer 632, and the indexer generates events from the event data. In some implementations, the event collector 630 sends an acknowledgement message to the data source 602 to indicate that the event collector 630 has received a particular request form the data source 602, and/or to indicate to the data source 602 that events in the request have been added to an index.

The indexer 632 ingests incoming data and transforms the data into searchable knowledge in the form of events. In the data intake and query system, an event is a single piece of data that represents activity of the component represented in FIG. 6 by the data source 602. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 632 can include a parsing module 634 and an indexing module 636 for generating and storing the events. The parsing module 634 and indexing module 636 can be modular and pipelined, such that one component can be operating on a first set of data while the second component is simultaneously operating on a second sent of data. Additionally, the indexer 632 may at any time have multiple instances of the parsing module 634 and indexing module 636, with each set of instances configured to simultaneously operate on data from the same data source or from different data sources. The parsing module 634 and indexing module 636 are illustrated in FIG. 6 to facilitate discussion, with the understanding that implementations with other components are possible to achieve the same functionality.

The parsing module 634 determines information about incoming event data, where the information can be used to identify events within the event data. For example, the parsing module 634 can associate a source type with the event data. A source type identifies the data source 602 and describes a possible data structure of event data produced by the data source 602. For example, the source type can indicate which fields to expect in events generated at the data source 602 and the keys for the values in the fields, and possibly other information such as sizes of fields, an order of the fields, a field separator, and so on. The source type of the data source 602 can be specified when the data source 602 is configured as a source of event data. Alternatively, the parsing module 634 can determine the source type from the event data, for example from an event field in the event data or using machine learning techniques applied to the event data.

Other information that the parsing module 634 can determine includes timestamps. In some cases, an event includes a timestamp as a field, and the timestamp indicates a point in time when the action represented by the event occurred or was recorded by the data source 602 as event data. In these cases, the parsing module 634 may be able to determine from the source type associated with the event data that the timestamps can be extracted from the events themselves. In some cases, an event does not include a timestamp and the parsing module 634 determines a timestamp for the event, for example from a name associated with the event data from the data source 602 (e.g., a file name when the event data is in the form of a file) or a time associated with the event data (e.g., a file modification time). As another example, when the parsing module 634 is not able to determine a timestamp from the event data, the parsing module 634 may use the time at which it is indexing the event data. As another example, the parsing module 634 can use a user-configured rule to determine the timestamps to associate with events.

The parsing module 634 can further determine event boundaries. In some cases, a single line (e.g., a sequence of characters ending with a line termination) in event data represents one event while in other cases, a single line represents multiple events. In yet other cases, one event may span multiple lines within the event data. The parsing module 634 may be able to determine event boundaries from the source type associated with the event data, for example from a data structure indicated by the source type. In some implementations, a user can configure rules the parsing module 634 can use to identify event boundaries.

The parsing module 634 can further extract data from events and possibly also perform transformations on the events. For example, the parsing module 634 can extract a set of fields (key-value pairs) for each event, such as a host or hostname, source or source name, and/or source type. The parsing module 634 may extract certain fields by default or based on a user configuration. Alternatively or additionally, the parsing module 634 may add fields to events, such as a source type or a user-configured field. As another example of a transformation, the parsing module 634 can anonymize fields in events to mask sensitive information, such as social security numbers or account numbers. Anonymizing fields can include changing or replacing values of specific fields. The parsing component 634 can further perform user-configured transformations.

The parsing module 634 outputs the results of processing incoming event data to the indexing module 636, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 632 can be configured to identify searchable segments that are parts of fields, searchable segments that are entire fields, or both. The parsing module 634 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 646, to find event data that matches a search query. In some implementations, segmentation can alternatively be performed by the forwarder 626. Segmentation can also be disabled, in which case the indexer 632 will not build a lexicon for the event data. When segmentation is disabled, the search system searches the event data directly.

Building index data structures generates the index 638. The index 638 is a storage data structure on a storage device (e.g., a disk drive or other physical device for storing digital data). The storage device may be a component of the computing device on which the indexer 632 is operating (referred to herein as local storage) or may be a component of a different computing device (referred to herein as remote storage) that the indexer 638 has access to over a network. The indexer 632 can manage more than one index and can manage indexes of different types. For example, the indexer 632 can manage event indexes, which impose minimal structure on stored data and can accommodate any type of data. As another example, the indexer 632 can manage metrics indexes, which use a highly structured format to handle the higher volume and lower latency demands associated with metrics data.

The indexing module 636 organizes files in the index 638 in directories referred to as buckets. The files in a bucket 644 can include raw data files, index files, and possibly also other metadata files. As used herein, "raw data" means data as when the data was produced by the data source 602, without alteration to the format or content. As noted previously, the parsing component 634 may add fields to event data and/or perform transformations on fields in the event data. Event data that has been altered in this way is referred to herein as enriched data. A raw data file 648 can include enriched data, in addition to or instead of raw data. The raw data file 648 may be compressed to reduce disk usage. An index file 646, which may also be referred to herein as a "time-series index" or tsidx file, contains metadata that the indexer 632 can use to search a corresponding raw data file 648. As noted above, the metadata in the index file 646 includes a lexicon of the event data, which associates each unique keyword in the event data with a reference to the location of event data within the raw data file 648. The keyword data in the index file 646 may also be referred to as an inverted index. In various implementations, the data intake and query system can use index files for other purposes, such as to store data summarizations that can be used to accelerate searches.

A bucket 644 includes event data for a particular range of time. The indexing module 636 arranges buckets in the index 638 according to the age of the buckets, such that buckets for more recent ranges of time are stored in short-term storage 640 and buckets for less recent ranges of time are stored in long-term storage 642. Short-term storage 640 may be faster to access while long-term storage 642 may be slower to access. Buckets may be moves from short-term storage 640 to long-term storage 642 according to a configurable data retention policy, which can indicate at what point in time a bucket is old enough to be moved.

A bucket's location in short-term storage 640 or long-term storage 642 can also be indicated by the bucket's status. As an example, a bucket's status can be "hot," "warm," "cold," "frozen," or "thawed." In this example, hot bucket is one to which the indexer 632 is writing data and the bucket becomes a warm bucket when the index 632 stops writing data to it. In this example, both hot and warm buckets reside in short-term storage 640. Continuing this example, when a warm bucket is moved to long-term storage 642, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 620 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 620 through the monitoring console 616 provided by the user interface system 614. Using the monitoring console 616, the user can configure and monitor an index cluster, and see information such as disk usage by an index, volume usage by an indexer, index and volume size over time, data age, statistics for bucket types, and bucket settings, among other information.

Figure 7:
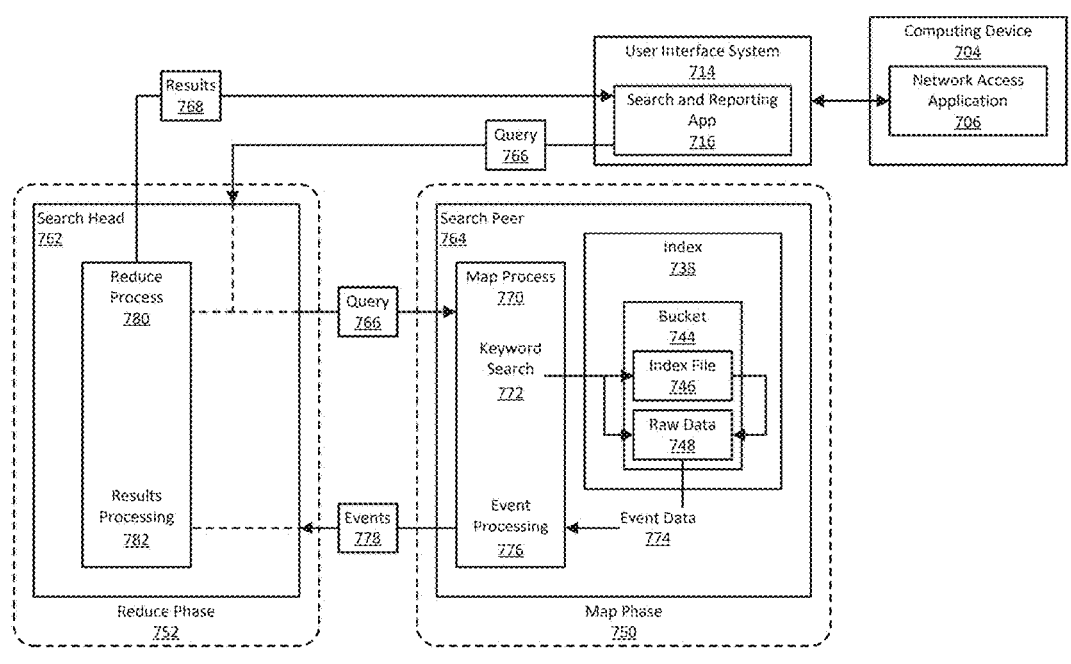
FIG. 7 is a block diagram illustrating in greater detail an example of the search system of a data intake and query system.

FIG. 7 is a block diagram illustrating in greater detail an example of the search system 760 of a data intake and query system, such as the data intake and query system 510 of FIG. 5. The search system 760 of FIG. 7 issues a query 766 to a search head 762, which sends the query 766 to a search peer 764. Using a map process 770, the search peer 764 searches the appropriate index 738 for events identified by the query 766 and sends events 778 so identified back to the search head 762. Using a reduce process 782, the search head 762 processes the events 778 and produces results 768 to respond to the query 766. The results 768 can provide useful insights about the data stored in the index 738. These insights can aid in the administration of information technology systems, in security analysis of information technology systems, and/or in analysis of the development environment provided by information technology systems.

The query 766 that initiates a search is produced by a search and reporting app 716 that is available through the user interface system 714 of the data intake and query system. Using a network access application 706 executing on a computing device 704, a user can input the query 766 into a search field provided by the search and reporting app 716. Alternatively or additionally, the search and reporting app 716 can include pre-configured queries or stored queries that can be activated by the user. In some cases, the search and reporting app 716 initiates the query 766 when the user enters the query 766. In these cases, the query 766 may be referred to as an "ad-hoc" query. In some cases, the search and reporting app 716 initiates the query 766 based on a schedule. For example, the search and reporting app 716 can be configured to execute the query 766 once per hour, once per day, at a specific time, on a specific date, or at some other time that can be specified by a date, time, and/or frequency. These types of queries may be referred to as scheduled queries.

The query 766 is specified using a search processing language. The search processing language includes commands or search terms that the search peer 764 will use to identify events to return in the search results 768. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 766 to include sequential commands, where a subsequent command may operate on the results of a prior command. As an example, sequential commands may be separated in the query 766 by a vertical line ("I" or "pipe") symbol.

In addition to one or more search commands, the query 766 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 766 occurs in two broad phases: a map phase 750 and a reduce phase 752. The map phase 750 takes place across one or more search peers. In the map phase 750, the search peers locate event data that matches the search terms in the search query 766 and sorts the event data into field-value pairs. When the map phase 750 is complete, the search peers send events that they have found to one or more search heads for the reduce phase 752. During the reduce phase 752, the search heads process the events through commands in the search query 766 and aggregate the events to produce the final search results 768.

A search head, such as the search head 762 illustrated in FIG. 7, is a component of the search system 760 that manages searches. The search head 762, which may also be referred to herein as a search management component, can be implemented using program code that can be executed on a computing device. The program code for the search head 762 can be stored on a non-transitory computer-readable medium and from this medium can be loaded or copied to the memory of a computing device. One or more hardware processors of the computing device can read the program code from the memory and execute the program code in order to implement the operations of the search head 762.

Upon receiving the search query 766, the search head 762 directs the query 766 to one or more search peers, such as the search peer 764 illustrated in FIG. 7. "Search peer" is an alternate name for "indexer" and a search peer may be largely similar to the indexer described previously. The search peer 764 may be referred to as a "peer node" when the search peer 764 is part of an indexer cluster. The search peer 764, which may also be referred to as a search execution component, can be implemented using program code that can be executed on a computing device. In some implementations, one set of program code implements both the search head 762 and the search peer 764 such that the search head 762 and the search peer 764 form one component. In some implementations, the search head 762 is an independent piece of code that performs searching and no indexing functionality. In these implementations, the search head 762 may be referred to as a dedicated search head.

The search head 762 may consider multiple criteria when determining whether to send the query 766 to the particular search peer 764. For example, the search system 760 may be configured to include multiple search peers that each have duplicative copies of at least some of the event data and are implanted using different hardware resources q. In this example, the sending the search query 766 to more than one search peer allows the search system 760 to distribute the search workload across different hardware resources. As another example, search system 760 may include different search peers for different purposes (e.g., one has an index storing a first type of data or from a first data source while a second has an index storing a second type of data or from a second data source). In this example, the search query 766 may specify which indexes to search, and the search head 762 will send the query 766 to the search peers that have those indexes.

To identify events 778 to send back to the search head 762, the search peer 764 performs a map process 770 to obtain event data 774 from the index 738 that is maintained by the search peer 764. During a first phase of the map process 770, the search peer 764 identifies buckets that have events that are described by the time indicator in the search query 766. As noted above, a bucket contains events whose timestamps fall within a particular range of time. For each bucket 744 whose events can be described by the time indicator, during a second phase of the map process 770, the search peer 764 performs a keyword search 774 using search terms specified in the search query #A66. The search terms can be one or more of keywords, phrases, fields, Boolean expressions, and/or comparison expressions that in combination describe events being searched for. When segmentation is enabled at index time, the search peer 764 performs the keyword search 772 on the bucket's index file 746. As noted previously, the index file 746 includes a lexicon of the searchable terms in the events stored in the bucket's raw data 748 file. The keyword search 772 searches the lexicon for searchable terms that correspond to one or more of the search terms in the query 766. As also noted above, the lexicon incudes, for each searchable term, a reference to each location in the raw data 748 file where the searchable term can be found. Thus, when the keyword search identifies a searchable term in the index file 746 that matches a search term in the query 766, the search peer 764 can use the location references to extract from the raw data 748 file the event data 774 for each event that include the searchable term.

In cases where segmentation was disabled at index time, the search peer 764 performs the keyword search 772 directly on the raw data 748 file. To search the raw data 748, the search peer 764 may identify searchable segments in events in a similar manner as when the data was indexed. Thus, depending on how the search peer 764 is configured, the search peer 764 may look at event fields and/or parts of event fields to determine whether an event matches the query 766. Any matching events can be added to the event data #A74 read from the raw data 748 file. The search peer 764 can further be configured to enable segmentation at search time, so that searching of the index 738 causes the search peer 764 to build a lexicon in the index file 746.

The event data 774 obtained from the raw data 748 file includes the full text of each event found by the keyword search 772. During a third phase of the map process 770, the search peer 764 performs event processing 776 on the event data 774, with the steps performed being determined by the configuration of the search peer 764 and/or commands in the search query 766. For example, the search peer 764 can be configured to perform field discovery and field extraction. Field discovery is a process by which the search peer 764 identifies and extracts key-value pairs from the events in the event data 774. The search peer 764 can, for example, be configured to automatically extract the first 100 fields (or another number of fields) in the event data 774 that can be identified as key-value pairs. As another example, the search peer 764 can extract any fields explicitly mentioned in the search query 766. The search peer 764 can, alternatively or additionally, be configured with particular field extractions to perform.

Other examples of steps that can be performed during event processing 776 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 764 sends processed events 778 to the search head 762, which performs a reduce process 780. The reduce process 780 potentially receives events from multiple search peers and performs various results processing 782 steps on the received events. The results processing 782 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 782 can further include applying commands from the search query 766 to the events. The query 766 can include, for example, commands for evaluating and/or manipulating fields (e.g., to generate new fields from existing fields or parse fields that have more than one value). As another example, the query 766 can include commands for calculating statistics over the events, such as counts of the occurrences of fields, or sums, averages, ranges, and so on, of field values. As another example, the query 766 can include commands for generating statistical values for purposes of generating charts of graphs of the events.

The reduce process 780 outputs the events found by the search query 766, as well as information about the events. The search head 762 transmits the events and the information about the events as search results 768, which are received by the search and reporting app 716. The search and reporting app 716 can generate visual interfaces for viewing the search results 768. The search and reporting app 716 can, for example, output visual interfaces for the network access application 706 running on a computing device 704 to generate.

The visual interfaces can include various visualizations of the search results 768, such as tables, line or area charts, Chloropleth maps, or single values. The search and reporting app 716 can organize the visualizations into a dashboard, where the dashboard includes a panel for each visualization. A dashboard can thus include, for example, a panel listing the raw event data for the events in the search results 768, a panel listing fields extracted at index time and/or found through field discovery along with statistics for those fields, and/or a timeline chart indicating how many events occurred at specific points in time (as indicated by the timestamps associated with each event). In various implementations, the search and reporting app 716 can provide one or more default dashboards. Alternatively or additionally, the search and reporting app 716 can include functionality that enables a user to configure custom dashboards.

The search and reporting app 716 can also enable further investigation into the events in the search results 716. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 766. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 8:
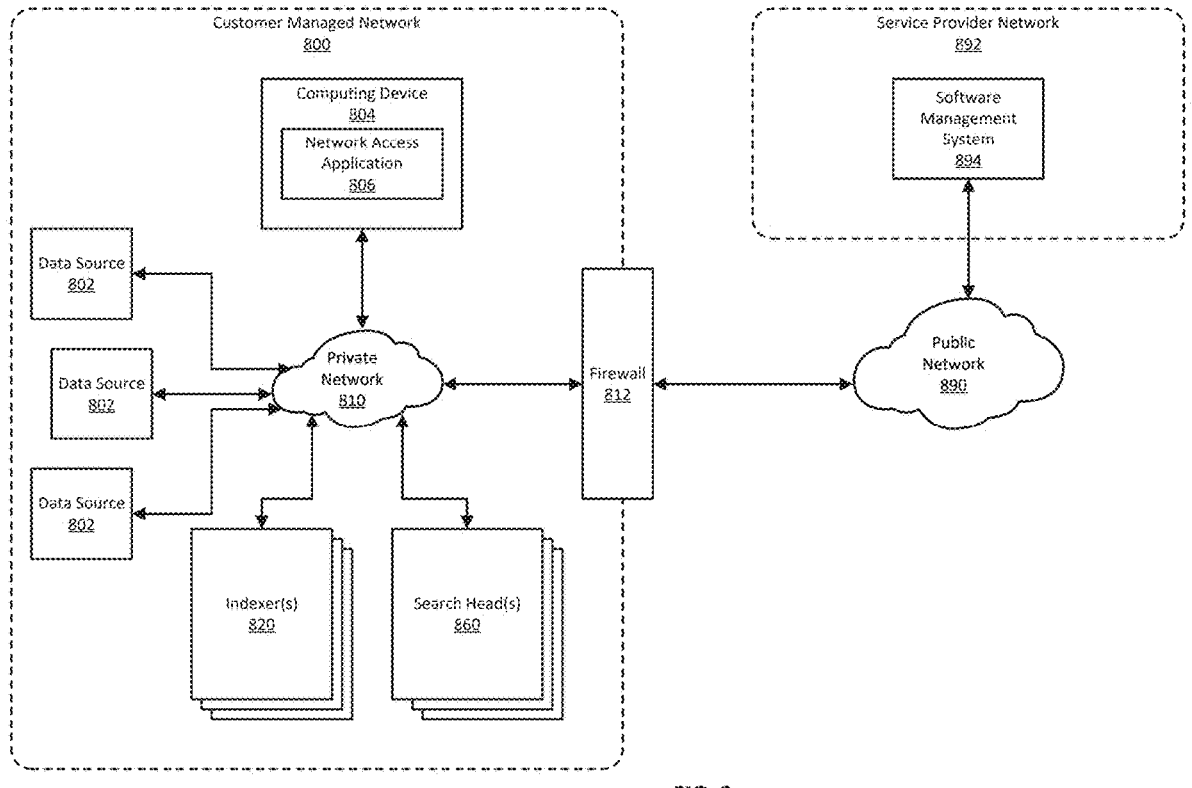
FIG. 8 illustrates an example of a self-managed network that includes a data intake and query system.

FIG. 8 illustrates an example of a self-managed network 800 that includes a data intake and query system. "Self-managed" in this instance means that the entity that is operating the self-managed network 800 configures, administers, maintains, and/or operates the data intake and query system using its own compute resources and people. Further, the self-managed network 800 of this example is part of the entity's on-premise network and comprises a set of compute, memory, and networking resources that are located, for example, within the confines of an entity's data center. These resources can include software and hardware resources. The entity can, for example, be a company or enterprise, a school, government entity, or other entity. Since the self-managed network 800 is located within the customer's on-prem environment, such as in the entity's data center, the operation and management of the self-managed network 800, including of the resources in the self-managed network 800, is under the control of the entity. For example, administrative personnel of the entity have complete access to and control over the configuration, management, and security of the self-managed network 800 and its resources.

The self-managed network 800 can execute one or more instances of the data intake and query system. An instance of the data intake and query system may be executed by one or more computing devices that are part of the self-managed network 800. A data intake and query system instance can comprise an indexing system and a search system, where the indexing system includes one or more indexers 820 and the search system includes one or more search heads 860.

As depicted in FIG. 8, the self-managed network 800 can include one or more data sources 802. Data received from these data sources may be processed by an instance of the data intake and query system within self-managed network 800. The data sources 802 and the data intake and query system instance can be communicatively coupled to each other via a private network 810.

Users associated with the entity can interact with and avail themselves of the functions performed by a data intake and query system instance using computing devices. As depicted in FIG. 8, a computing device 804 can execute a network access application 806 (e.g., a web browser), that can communicate with the data intake and query system instance and with data sources 802 via the private network 810. Using the computing device 804, a user can perform various operations with respect to the data intake and query system, such as management and administration of the data intake and query system, generation of knowledge objects, and other functions. Results generated from processing performed by the data intake and query system instance may be communicated to the computing device 804 and output to the user via an output system (e.g., a screen) of the computing device 804.

The self-managed network 800 can also be connected to other networks that are outside the entity's on-premise environment/network, such as networks outside the entity's data center. Connectivity to these other external networks is controlled and regulated through one or more layers of security provided by the self-managed network 800. One or more of these security layers can be implemented using firewalls 812. The firewalls 812 form a layer of security around the self-managed network 800 and regulate the transmission of traffic from the self-managed network 800 to the other networks and from these other networks to the self-managed network 800.

Networks external to the self-managed network can include various types of networks including public networks 890, other private networks, and/or cloud networks provided by one or more cloud service providers. An example of a public network 890 is the Internet. In the example depicted in FIG. 8, the self-managed network 800 is connected to a service provider network 892 provided by a cloud service provider via the public network 890.

In some implementations, resources provided by a cloud service provider may be used to facilitate the configuration and management of resources within the self-managed network 800. For example, configuration and management of a data intake and query system instance in the self-managed network 800 may be facilitated by a software management system 894 operating in the service provider network 892. There are various ways in which the software management system 894 can facilitate the configuration and management of a data intake and query system instance within the self-managed network 800. As one example, the software management system 894 may facilitate the download of software including software updates for the data intake and query system. In this example, the software management system 894 may store information indicative of the versions of the various data intake and query system instances present in the self-managed network 800. When a software patch or upgrade is available for an instance, the software management system 894 may inform the self-managed network 800 of the patch or upgrade. This can be done via messages communicated from the software management system 894 to the self-managed network 800.

The software management system 894 may also provide simplified ways for the patches and/or upgrades to be downloaded and applied to the self-managed network 800. For example, a message communicated from the software management system 894 to the self-managed network 800 regarding a software upgrade may include a Uniform Resource Identifier (URI) that can be used by a system administrator of the self-managed network 800 to download the upgrade to the self-managed network 800. In this manner, management resources provided by a cloud service provider using the service provider network 892 and which are located outside the self-managed network 800 can be used to facilitate the configuration and management of one or more resources within the entity's on-prem environment. In some implementations, the download of the upgrades and patches may be automated, whereby the software management system 894 is authorized to, upon determining that a patch is applicable to a data intake and query system instance inside the self-managed network 800, automatically communicate the upgrade or patch to self-managed network 800 and cause it to be installed within self-managed network 800.

Still further, the software management system 894 may facilitate monitoring of the customer managed network 800, such as for security purposes. For example, the software management system 894 may provide the interface 200 of FIG. 2. Moreover, the software management system 894 may implement various functionalities described above, such as by providing security vulnerability monitoring with compromised data tracking. In some instances, software management system 894 may be multi-tenanted, such that security information can, when appropriately stripped of sensitive, confidential, or proprietary information and with consent of an operator of the customer managed network 800, be aggregated across customers and used to improve security of various networks 800 among different customers.

In some implementations, a data intake and query system as described above may further include a stream data processing system. The stream data processing system can illustratively be configured to operate on the basis of data streams, rather than data sets, such as by manipulating the data streams according to one or more data sets of data processing instructions, sometimes referred to as pipelines.

Figure 9:
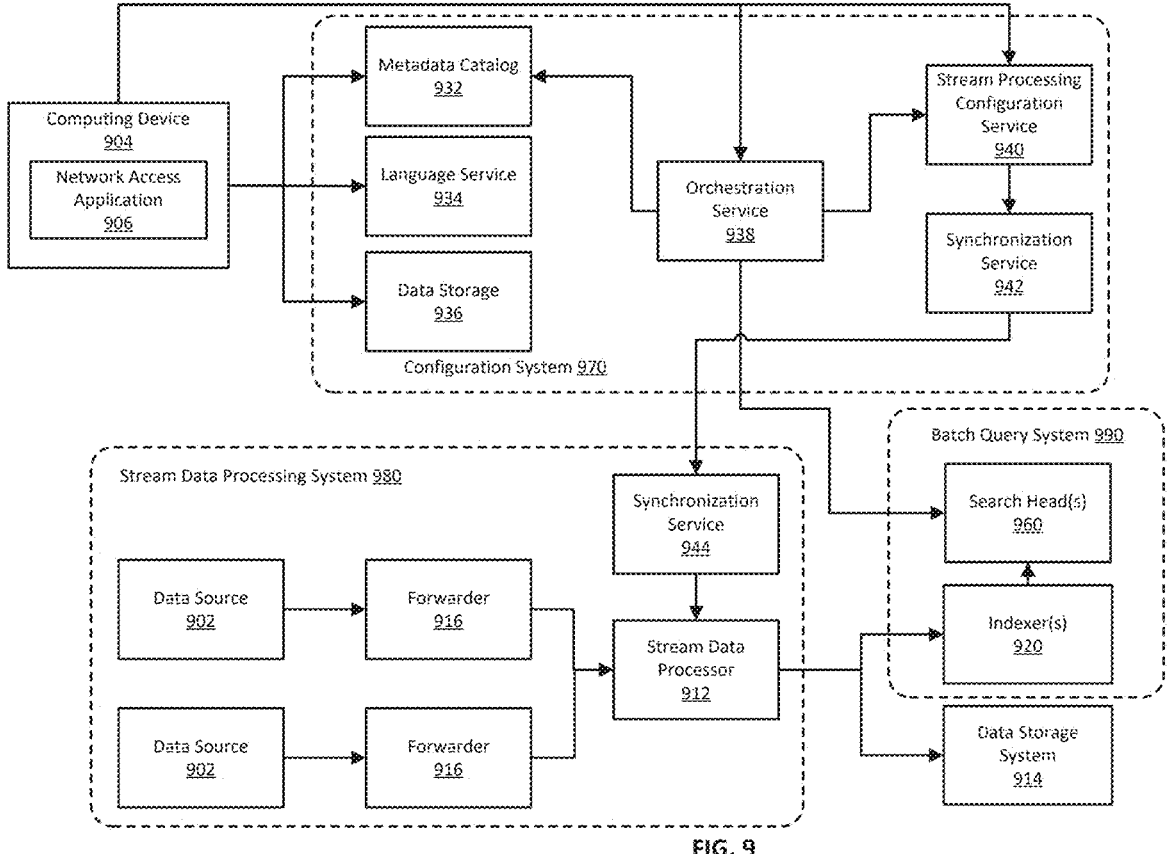
FIG. 9 illustrates an example implementation of a data intake and query system including a stream data processing system.

One example implementation of a data intake and query system including a stream data processing system is shown in FIG. 9. The data intake and query system of FIG. 9 includes a batch query system 990, including a search head 960 and an indexer 920. The search head 960 and indexer 920 may operate similarly to the various search heads and indexers described above, such as the search heads 860 and indexers 820 of FIG. 8.

As shown in FIG. 9, the search head 960 and indexer 920 can (in addition or alternatively to obtaining from data sources 902) obtain data from a stream data processor 912 of a stream data processing system 980. The stream data processor 912, in turn, can be configured to obtain data from data sources 902 as an input data stream, manipulate the data according to one or more data stream processing instruction set, and output the resulting data stream to indexers 920 or other network-accessible storage, such as the data storage system 914. For example, the stream data processing system 980 can include one or more forwarders 916 configured to obtain data from data sources 902 and forward the data to the stream data processor 912. In one example, the stream data processor 912 conducts filtering prior to data moving to indexers 920. Illustratively, the stream data processor 912 may identify high value data and route such data to indexers 920, while routing remaining data to the data storage system 914. In another example, the stream data processor 912 conducts other manipulations, such as re-formatting data, compressing data, or the like.

Illustratively, forwarders 916 may be configured to support a variety of protocols, transmission formats, and data formats that may be used by various data sources 902, and to forward such data to a stream data processor 912 in a format acceptable to the process 912. In some implementations, the stream data processor 912 may obtain data directly from data sources 902 and forwarders 916 may be omitted.

The data intake and query system of FIG. 9 can further include a configuration system 970 enabling user configuration of the stream data processing system 980, the batch query system 990, or both. Illustratively, a user may utilize a network access application 906, such as a web browser, executing on a computing device 904 to interact with the configuration system 970 and appropriately configure the stream data processing system 980, the batch query system 990, or both. The configuration system 970 can include a variety of elements facilitating such configuration. For example, the configuration system 970 can include data storage 936 for storage of information used by the network access application 906, such as web pages renderable on the application 906 to display interfaces facilitating configuration. The configuration system 970 can further include a language service 934 to facilitate creation of batch queries and/or pipelines implementable on the data intake and query system. For example, the language service 934 may be configured to interpret textual queries as either or both batch queries and pipelines, and generate computer executable instructions executable by the respective stream data processing system 980 and batch query system 990 to implement the textual queries. The configuration system 970 can further include a metadata catalog 932 storing information regarding the data intake and query system, such as groups (e.g., buckets) of data stored on the batch query system 990, identifiers for such groups, indexes of such groups, etc. and a configuration of the stream data processing system 980, such as data stream processing instruction sets deployed to the system 980 or metadata regarding such pipelines. Illustratively, the network access application 906 may utilize metadata stored within the metadata catalog 932 to enable a user of the computing device 904 to browse data on the data intake and query system, form queries against that data, configure or reconfigure pipelines, and the like.

The configuration system 970 shown in FIG. 9 further includes an orchestration service 938 configured to orchestrate operation of the data intake and query system. For example, the orchestration service 938 can be configured to determine whether to implement a query statement on the stream data processing system 980, the batch query system 990, or both (based, e.g., on a time range specified within the query, a source or destination specified in the query, etc.). The orchestration service 938 can further maintain the metadata catalog 932 based on results of such queries. In accordance with embodiments of the present disclosure, the orchestration service 938 may act as a user interface system 116, monitoring for vulnerabilities of applications installed on the configuration system 970, stream data processing system 980, or batch query system 990 and providing indications of data potentially compromised by such vulnerabilities.

The configuration system 970 in FIG. 9 further includes a stream processing configuration service 940 enabling configuration of the stream data processing system 980. For example, the stream processing configuration service 940 may obtain configuration instructions from the computing device 904 and/or from the orchestration service 938 and generate a configuration for the stream data processing system 980 from such instructions. For example, the stream processing configuration service 940 may generate instructions to implement a data stream processing instruction set based on input from the computing device 904 and/or the orchestration service 938. The stream processing configuration service 940 can illustratively interact with a synchronization service 942 to provide configuration data to the stream data processing system 980. For example, the synchronization service 942 of the configuration system 970 may interact with a synchronization service 944 of the stream data processing system 980 to synchronize a configuration of the stream data process 912 with that generated at the stream processing configuration service 940.

Accordingly, by use of the configuration system 970, a user at a computing device 904 may configure and utilize either or both the stream data processing system 980 and batch query system 990.

In one embodiment, each of the configuration system 970, stream data processing system 980, and batch query system 990 is implemented within a distinct computing environment. For example, the configurations system 970 may be implemented within a multi-tenant hosted computing environment (which hosted computing environment is sometimes referred to as a "cloud computing environment"). The stream data processing system 980 may be implemented within a private computing environment, such as a private data center of an end user of the data intake and query system, which private computing environment may be referred to in some cases as an "on premises" environment. The batch query system 990 may be implemented within a single tenanted hosted computing environment, such as a cloud-hosted environment dedicated to the end user associated with the batch query system 990. Each of the elements of FIG. 9 may be in communication with one another via one or more networks, including private networks and/or public networks. Lines within FIG. 9 should be understood to depict illustrative logical interactions between elements; however, elements may interact in ways not depicted within FIG. 9.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method comprising:

obtaining, by a data intake and query system, specification of a partitioned dataset in a data store, the specification identifying a set of user-defined partitions included in the partitioned dataset, wherein the partitioned dataset is represented as a tree data structure, wherein each partition in the set of user-defined partitions corresponds to a child node, of a root node of the tree data structure, that is associated with user-defined criteria for data objects to be written to a corresponding partition, and wherein each child node corresponds to one or more leaf nodes identifying a data storage destination;

obtaining, by the data intake and query system, a request to write one or more data objects to the partitioned dataset, the request comprising an identifier of the partitioned dataset; and writing, by the data intake and query system, the one or more data objects to the partitioned dataset, wherein writing the one or more data objects to the partitioned dataset comprises:

analyzing a plurality of user-defined criteria associated with a plurality of child nodes of the root node of the tree data structure to determine that a data object of the one or more data objects satisfies a particular user-defined criteria, of a particular child node, for the data object to be written to the corresponding partition, the particular user-defined criteria specifying a value of a field associated with the data object;

based on the data object satisfying the particular user-defined criteria of the particular child node, identifying the one or more leaf nodes corresponding to the particular child node, and for each leaf node of the identified one or more leaf nodes, generating and executing a request to write the data object to the data storage destination corresponding to the leaf node.

2. The computer-implemented method of claim 1, further comprising:

obtaining, by the data intake and query system, a request to read the one or more data objects from the partitioned dataset, the request comprising an identifier of the partitioned dataset;

reading, by the data intake and query system, the one or more data objects from the partitioned dataset, wherein reading the one or more data objects from the partitioned dataset comprises generating a query to read from a union of data storage destination corresponding to each leaf node of the tree data structure; and providing results of the query as a response to the read request.

3. The computer-implemented method of claim 1, wherein obtaining the request to write the one or more data objects to the partitioned dataset includes obtaining a stream of data objects to be written to the partitioned dataset.

4. The computer-implemented method of claim 1, wherein obtaining the request to write the one or more data objects to the partitioned dataset includes obtaining a query to the data intake and query system instructing to write the one or more data objects specified in the query to the partitioned dataset.

5. The computer-implemented method of claim 1, wherein the partitioned dataset further includes a default partition, wherein the default partition is not included in the set of user-defined partitions, wherein the default partition corresponds to a first child node, and wherein writing the one or more data objects to the partitioned dataset further comprises:

when a second data object of the one or more data objects fails to satisfy the user-defined criteria for any child node corresponding to a partition in the set of user-defined partitions:

identifying a set of leaf nodes corresponding to the default partition; and for each leaf node of the identified set of leaf nodes corresponding to the default partition, generating and executing a request to write the data object to the data storage destination corresponding to the leaf node.

6. The computer-implemented method of claim 1, wherein obtaining the specification of the partitioned dataset comprises:

obtaining specification of a processing pipeline including criteria for the data objects to be processed by the processing pipeline; and generating a first partition of the set of user-defined partitions, with criteria corresponding to the criteria of the processing pipeline.

7. The computer-implemented method of claim 6 further comprising deploying the processing pipeline to a stream data processing system, wherein deploying the processing pipeline comprises:

configuring the stream data processing system to write an input data stream including the one or more data objects to the partitioned dataset;

modifying the processing pipeline to read from the first partition of the set of user-defined partitions, wherein modifying the processing pipeline results in a modified processing pipeline; and configuring the stream data processing system to implement the modified processing pipeline.

8. The computer-implemented method of claim 1, wherein at least one child node is a leaf node.

9. The computer-implemented method of claim 1, wherein at least one child node is a parent of the one or more leaf nodes.

10. The computer-implemented method of claim 1, wherein the specification is stored as a first data object in an object notation format.

11. The computer-implemented method of claim 1, wherein the data storage destination is one of: a substrate storage system or another partitioned dataset that itself identifies one or more substrate storage systems.

12. The computer-implemented method of claim 11, wherein the substrate storage system is a file system or an object storage system.

13. The computer-implemented method of claim 1, wherein the user-defined criteria of each child node is either exclusive among child nodes at a level of the tree data structure or non-exclusive among child nodes at the level of the tree data structure.

14. A system, comprising:

a data store storing computer-executable instructions; and a processor configured to execute the computer-executable instructions, wherein execution of the computer-executable instructions causes the system to:

obtain, by a data intake and query system, specification of a partitioned dataset in a data store, the specification identifying a set of user-defined partitions included in the partitioned dataset, wherein the partitioned dataset is represented as a tree data structure, wherein each partition in the set of user-defined partitions corresponds to a child node, of a root node of the tree data structure, that is associated with user-defined criteria for data objects to be written to a corresponding partition, and wherein each child node corresponds to one or more leaf nodes identifying a data storage destination;

obtain, by the data intake and query system, a request to write one or more data objects to the partitioned dataset, the request comprising an identifier of the partitioned dataset; and write, by the data intake and query system, the one or more data objects to the partitioned dataset, wherein to write the one or more data objects to the partitioned dataset, the execution of the computer-executable instructions causes the system to:

analyze a plurality of user-defined criteria associated with a plurality of child nodes of the root node of the tree data structure to determine that a data object of the one or more data objects satisfies a particular user-defined criteria, of a particular child node, for the data object to be written to the corresponding partition, the particular user-defined criteria specifying a value of a field associated with the data object based on the data object satisfying the particular user-defined criteria of the particular child node, identify the one or more leaf nodes corresponding to the particular child node, and for each leaf node of the identified one or more leaf nodes, generate and execute a request to write the data object to the data storage destination corresponding to the leaf node.

15. The system of claim 14, wherein the execution of the computer-executable instructions further causes the system to:

obtain, by the data intake and query system, a request to read the one or more data objects from the partitioned dataset, the request comprising an identifier of the partitioned dataset;

read, by the data intake and query system, the one or more data objects from the partitioned dataset, wherein to read the one or more data objects from the partitioned dataset, execution of the computer-executable instructions further causes the system to generate a query to read from a union of data storage destination corresponding to each leaf node of the tree data structure; and provide results of the query as a response to the read request.

16. The system of claim 14, wherein to obtain the request to write the one or more data objects to the partitioned dataset, the execution of the computer-executable instructions further causes the system to obtain a stream of data objects to be written to the partitioned dataset.

17. The system of claim 14, wherein to obtain the request to write the one or more data objects to the partitioned dataset, the execution of the computer-executable instructions further causes the system to obtain a query to the data intake and query system instructing to write one or more data objects specified in the query to the partitioned dataset.

18. The system of claim 14, wherein the partitioned dataset further includes a default partition, wherein the default partition is not included in the set of user-defined partitions, wherein the default partition corresponds to a first child node, and wherein to write the one or more data objects to the partitioned dataset, the execution of the computer-executable instructions further causes the system to:

when a second data object of the one or more data objects fails to satisfy the user-defined criteria for any child node corresponding to a partition in the set of user-defined partitions:

identify a set of leaf nodes corresponding to the default partition; and for each leaf node of the identified set of leaf nodes corresponding to the default partition, generate and execute a request to write the data object to the data storage destination corresponding to the leaf node.

19. One or more non-transitory computer-readable media comprising computer-executable instructions, that, when executed, cause a system to:

obtain, by a data intake and query system, specification of a partitioned dataset in a data store, the specification identifying a set of user-defined partitions included in the partitioned dataset, wherein the partitioned dataset is represented as a tree data structure, wherein each partition in the set of user-defined partitions corresponds to a child node, of a root node of the tree data structure, that is associated with user-defined criteria for data objects to be written to a corresponding partition, and wherein each child node corresponds to one or more leaf nodes identifying a data storage destination;

obtain, by the data intake and query system, a request to write one or more data objects to the partitioned dataset, the request comprising an identifier of the partitioned dataset; and write, by the data intake and query system, the one or more data objects to the partitioned dataset, wherein to write the one or more data objects to the partitioned dataset, execution of the computer-executable instructions causes the system to:

analyze a plurality of user-defined criteria associated with a plurality of child nodes of the root node of the tree data structure to determine that a data object of the one or more data objects satisfies a particular user-defined criteria, of a particular child node, for the data object to be written to the corresponding partition, the particular user-defined criteria specifying a value of a field associated with the data object;

based on the data object satisfying the particular user-defined criteria of the particular child node, identify the one or more leaf nodes corresponding to the particular child node, and for each leaf node of the identified one or more leaf nodes, generate and execute a request to write the data object to the data storage destination corresponding to the leaf node.

20. The one or more non-transitory computer-readable media of claim 19, wherein execution of the computer-executable instructions further causes the system to:

obtain, by the data intake and query system, a request to read the one or more data objects from the partitioned dataset, the request comprising an identifier of the partitioned dataset;

read, by the data intake and query system, the one or more data objects from the partitioned dataset, wherein to read the one or more data objects from the partitioned dataset, execution of the computer-executable instructions further causes the system to generate a query to read from a union of data storage destination corresponding to each leaf node of the tree data structure; and provide results of the query as a response to the read request.

* * * * *